(12) United States Patent
Morinaga

(10) Patent No.: US 11,668,985 B2
(45) Date of Patent: Jun. 6, 2023

(54) LIQUID CRYSTAL DISPLAY DEVICE

(71) Applicant: SHARP KABUSHIKI KAISHA, Sakai (JP)

(72) Inventor: Junichi Morinaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/467,415

(22) Filed: Sep. 6, 2021

(65) Prior Publication Data
US 2022/0100043 A1    Mar. 31, 2022

(30) Foreign Application Priority Data

Sep. 25, 2020 (JP) .............................. JP2020-161101

(51) Int. Cl.
*G02F 1/1362* (2006.01)
*G02F 1/1368* (2006.01)
*G06F 3/041* (2006.01)

(52) U.S. Cl.
CPC ...... *G02F 1/136222* (2021.01); *G02F 1/1368* (2013.01); *G02F 1/136286* (2013.01); *G02F 2201/123* (2013.01); *G06F 3/0412* (2013.01)

(58) Field of Classification Search
None
See application file for complete search history.

(56) References Cited

U.S. PATENT DOCUMENTS

| | | | | |
|---|---|---|---|---|
| 2013/0257794 A1* | 10/2013 | Lee | ..................... | G06F 3/04164 345/174 |
| 2015/0187821 A1* | 7/2015 | Kim | ..................... | H01L 27/1262 257/390 |
| 2016/0246399 A1* | 8/2016 | Huang | .................. | G06F 3/0412 |
| 2016/0253023 A1 | 9/2016 | Aoyama et al. | | |
| 2016/0291377 A1* | 10/2016 | Kosuge | ............... | G02F 1/13439 |
| 2017/0131585 A1* | 5/2017 | Cho | ..................... | H01L 27/1259 |
| 2017/0199411 A1* | 7/2017 | Kim | ..................... | H01L 29/7869 |
| 2018/0059840 A1* | 3/2018 | Hirosawa | ............. | G06F 3/0446 |
| 2018/0150180 A1 | 5/2018 | Aoyama et al. | | |
| 2018/0150181 A1 | 5/2018 | Aoyama et al. | | |
| 2019/0056620 A1* | 2/2019 | Akiyoshi | .......... | G02F 1/133512 |
| 2019/0250762 A1 | 8/2019 | Aoyama et al. | | |
| 2020/0201095 A1 | 6/2020 | Chikama et al. | | |
| 2020/0218396 A1 | 7/2020 | Aoyama et al. | | |

FOREIGN PATENT DOCUMENTS

| | | |
|---|---|---|
| JP | 2001-66617 A | 3/2001 |
| JP | 2016-191891 A | 11/2016 |
| WO | 2016/136271 A1 | 9/2016 |
| WO | 2018/225645 A1 | 12/2018 |

* cited by examiner

*Primary Examiner* — Shan Liu
(74) *Attorney, Agent, or Firm* — ScienBiziP, P.C.

(57) ABSTRACT

The present invention provides a liquid crystal display device provided with an in-cell touch panel, capable of reducing or preventing color mixing in an oblique view while reducing or preventing a reduction in transmittance, and of reducing or preventing a reduction in display quality. The liquid crystal display device includes: a first substrate; a second substrate facing the first substrate; and a liquid crystal layer between the first substrate and the second substrate. The first substrate includes: a thin-film transistor; a pixel electrode connected to the thin-film transistor; a color filter layer including color filters of multiple colors; a touch panel line on a liquid crystal layer side of the color filter layer; and a flattening film on a liquid crystal layer side of the touch panel line.

11 Claims, 18 Drawing Sheets

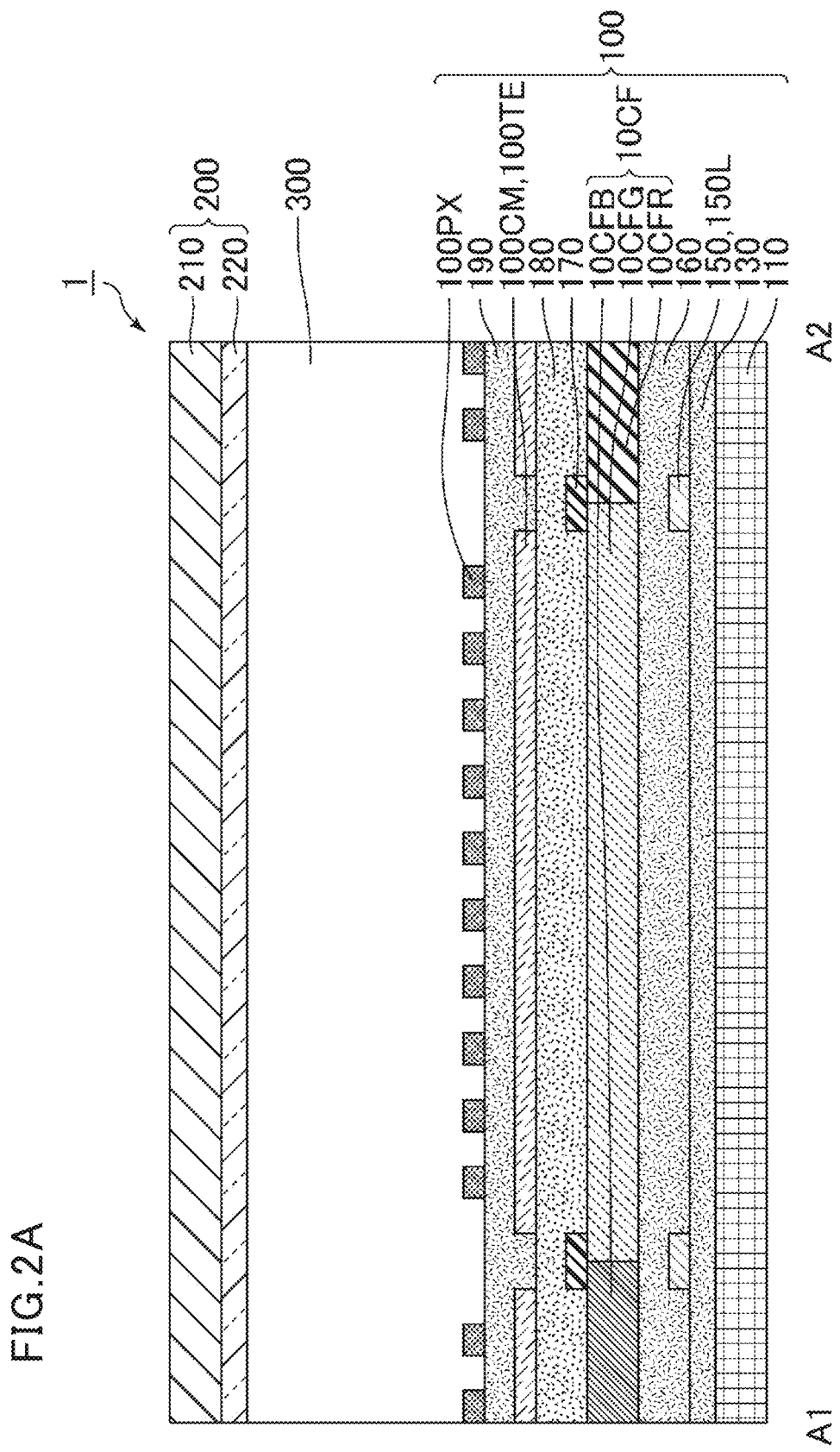

LIQUID CRYSTAL DISPLAY DEVICE

CROSS-REFERENCE TO RELATED APPLICATIONS

The present application claims priority under 35 § 119 to Japanese Patent Application No. 2020-161101 filed on Sep. 25, 2020, the contents of which are incorporated herein by reference in their entirety.

BACKGROUND OF THE INVENTION

Field of the Invention

The present invention relates to liquid crystal display devices.

Description of Related Art

Liquid crystal display devices are display devices utilizing a liquid crystal composition to display images and includes, for example, a liquid crystal display panel including a TFT substrate provided with thin-film transistors (TFTs), a counter substrate facing the TFT substrate, and a liquid crystal layer between the TFT substrate and the counter substrate; and paired polarizing plates on the viewing surface side and on the back surface side of the liquid crystal display panel. In a typical display mode thereof, voltage is applied to liquid crystal molecules in the liquid crystal layer such that the alignment of the liquid crystal molecules is changed, whereby the amount of light transmitted is controlled. Such liquid crystal display devices have advantageous features such as thin profile, light weight, and low power consumption, and are therefore used in a variety of fields.

Liquid crystal display devices provided with a touch panel have been widely used for smartphones and tablet terminals recently. Liquid crystal display devices provided with a touch panel have two types: the mounting type (those having a touch sensor on the viewing surface side of a viewing surface side polarizing plate) and the built-in type. The built-in type includes the on-cell type and the in-cell type. A liquid crystal display device provided with an in-cell touch panel includes a layer functioning as a touch sensor in a liquid crystal display panel. A liquid crystal display device provided with an on-cell touch panel includes a layer functioning as a touch sensor between a liquid crystal display panel and a polarizing plate (e.g., between a counter substrate and a polarizing plate).

In order to reduce the thickness of a liquid crystal display device as a whole, liquid crystal display devices provided with an in-cell touch panel have been more and more introduced recently. As an example relating to a liquid crystal display device provided with an in-cell touch panel, WO 2018/225645 discloses a liquid crystal display device including: a pair of substrates; a liquid crystal layer placed between the two substrates; a plurality of switching elements provided on a first one of the two substrates; a plurality of pixel electrodes provided on the first substrate; a common electrode provided on the first substrate; a color filter, provided on the first substrate, placed between the switching elements and the pixel electrodes, and placed in such a manner as to overlap each of the plurality of pixel electrodes, that includes a plurality of colored portions that exhibit different colors from one another; and a light-blocking conducting film provided on the first substrate, placed closer to the liquid crystal layer than the switching elements while having a light blocking effect, placed in such a manner as to overlap a boundary portion between two adjacent colored portions of the plurality of colored portions, and electrically connected to the common electrode, wherein the common electrode serves as a position detection electrode that forms an electrostatic capacitance with a position input body which performs a position input and that detects a position input performed by the position input body, and the light-blocking conducting film is a wire that is capable of transmitting a signal to the position detection electrode.

WO 2016/136271 discloses a display panel including; a plurality of gate signal lines extending in a first direction; a plurality of data signal lines and a plurality of sensor electrode lines, which extend in a second direction different from the first direction; a plurality of pixel electrodes arranged so as to respectively correspond to a plurality of pixels arrayed in the first direction and the second direction, the plurality of pixel electrodes being divided into a plurality of groups; and a plurality of common electrodes arranged at a ratio of one to a plurality of pixel electrodes included in one of the plurality of groups, wherein: each of the plurality or sensor electrode lines overlaps with corresponding one of the plurality of data signal lines in a plan view; each of the plurality of common electrodes overlapping with at least two of the plurality of sensor electrode lines in the plan view and is electrically connected to at least one of the two sensor electrode lines; and at least one insulating film is formed between the plurality of data signal lines and the plurality of sensor electrode lines, between the plurality of sensor electrode lines and the plurality of common electrodes, and between the plurality of common electrodes and the plurality of pixel electrodes.

Liquid crystal display devices are provided with color filters (CFs) to provide color display. Typically CFs are disposed on a counter substrate. Additionally studied is the CF on array (COA) technique in which CFs are disposed on the TFT substrate side. For example, JP 2016-191891 A discloses a liquid crystal display device including: a thin-film transistor substrate; a counter substrate above the thin-film transistor substrate; and a liquid crystal layer between the thin-film transistor substrate and the counter substrate, the thin-film transistor substrate including: a thin-film transistor; a first transmissive electrode; a second transmissive electrode that is to generate an electric field with the first transmissive electrode; a color filter; a spacer protruding upward and being in contact with the counter substrate; and a first alignment film having undergone a photo-alignment treatment and disposed in at least part of the spacer, the counter substrate including a second alignment film having undergone a rubbing alignment treatment.

JP 2001-66617 A discloses a liquid crystal display device including a first transparent substrate; a second transparent substrate; and liquid crystal between the substrates, wherein the liquid crystal display device is configured to dominantly generate an electric field that is parallel to the substrates to drive the liquid crystal, the first substrate includes a thin-film transistor including a scanning line to which a scanning voltage is to be applied, a gate electrode electrically connected to the scanning line, a signal line to which a signal voltage is to be applied, a source electrode electrically connected to the signal line, and a drain electrode electrically connected to the pixel electrode, a color filter is disposed as a layer covering all top surfaces of these components, and a pixel electrode and a COM electrode to which a common voltage is to be applied are disposed in the same layer above the color filter.

BRIEF SUMMARY OF THE INVENTION

Here, color mixing is described with reference to a liquid crystal display device of Comparative Embodiment 1. FIG. 13 is a figure relating to a liquid crystal display device of Comparative Embodiment 1, showing a schematic plan view, when no fitting displacement occurs in attaching a TFT substrate to a counter substrate. FIG. 14 is a schematic cross-sectional view taken along the line A1-A2 in FIG. 13.

A liquid crystal display device 1R of Comparative Embodiment 1 includes a TFT substrate 100 including TFTs, a counter substrate 200 including a color filter layer 10CF, and a liquid crystal layer 300 between the TFT substrate 100 and the counter substrate 200. The TFT substrate 100 includes in the order toward the liquid crystal layer 300 a glass substrate 110 and pixel electrodes 100PX. The counter substrate 200 includes in the order toward the liquid crystal layer 300 a glass substrate 210, the color filter layer 10CF and a black matrix layer 10BM, and an overcoat layer 220.

The color filter layer 10CF includes red color filters 10CFR, blue color filters 10CFB, and green color filters 10CFG. Each pixel 10P includes three sub-pixels, i.e., a red sub-pixel 10PR provided with a red color filter 10CFR, a blue sub-pixel 10PB provided with a blue color filter 10CFB, and a green sub-pixel 10PG provided with a green color filter 10CFG, in a stripe pattern. Also, the black matrix layer 10BM is disposed so as to separate the color filters from each other.

When no fitting displacement occurs between the TFT substrate 100 and the counter substrate 200 in the liquid crystal display device 1R of Comparative Embodiment 1, no color mixing in an oblique view is observed even in an oblique view with light transmitted through a blue color filter. As shown in FIG. 13 and FIG. 14, in an oblique view with light transmitted through a blue color filter, light L from the blue sub-pixel 10PB is blocked by the black matrix layer 10BM and is thus prevented from passing through the red color filter 10CFR disposed in the red sub-pixel 10PR and from leaking to the viewing surface side. The black matrix layer is thus disposed at color boundaries to prevent color mixing in an oblique view.

When fitting displacement occurs between the TFT substrate 100 and the counter substrate 200, color mixing in an oblique view unfortunately occurs due to the following reason even when the black matrix layer 10BM is disposed. FIG. 15 is a figure relating to the liquid crystal display device of Comparative Embodiment 1, showing a schematic plan view when fitting displacement occurs in attaching the TFT substrate to the counter substrate. FIG. 16 is a schematic cross-sectional view taken along the line A1-A2 in FIG. 15.

When fitting displacement occurs between the TFT substrate 100 and the counter substrate 200 in the liquid crystal display device 1R of Comparative Embodiment 1, in an oblique view with light transmitted through a blue color filter, the light L from the blue sub-pixel 10PB is not blocked by the black matrix layer 10BM, passes through the red color filter 10CFR, and leaks to the viewing surface side as red light, resulting in color mixing in an oblique view as shown in FIG. 15 and FIG. 16.

In the liquid crystal display device 1R of Comparative Embodiment 1, the pixel electrodes 100PX are disposed on the TFT substrate 100 side, and the color filter layer 10CF and the black matrix layer 10BM are disposed on the counter substrate 200 side. Thus, displacement of substrates in attaching, deflection and deformation caused by external stress, or the like lead to positional misalignment between the black matrix layer 10BM disposed at the color boundaries and the pixel electrodes 100PX to cause light leakage in an oblique direction as shown in FIG. 15 and FIG. 16, resulting in a color mixing defect.

In order to reduce color mixing in an oblique view caused by such fitting displacement, an increase in light-shielding width (width of the black matrix layer) has been studied. Unfortunately, a large amount of fitting displacement leads to a considerable amount of increase in light-shielding width. Such a structure reduces the aperture ratio to cause a reduced transmittance of the liquid crystal display device.

In a recent trend where liquid crystal display devices are used in various applications, curved displays having a curved liquid crystal panel have been studded. In a curved display, a liquid crystal panel is to be curved, and thus the fitting displacement increases in response to the curvature, leading to a further increased width of a black matrix layer. Such a structure also reduces the aperture ratio to cause a reduced transmittance of the liquid crystal display device.

Various types of touch panels have been conventionally proposed. Recently, in order to reduce the thickness of a liquid crystal display device as a whole, there is an increasing demand for liquid crystal display devices provided with an in-cell touch panel in which a TFT substrate includes a structure for a touch sensor. FIG. 17 is a schematic cross-sectional view of the liquid crystal display device of Comparative Embodiment 2. The liquid crystal display device 1R of Comparative Embodiment 2 shown in FIG. 17 is a liquid crystal display device provided with an in-cell touch panel, and includes the TFT substrate 100, the counter substrate 200 facing the TFT substrate 100, and the liquid crystal layer 300 between the TFT substrate 100 and the counter substrate 200.

The TFT substrate 100 includes in the order toward the liquid crystal layer 300 the glass substrate 110, a first insulating layer 130, source lines 150L, a second insulating layer 160, a resin flattening film 165, the pixel electrodes 100PX and touch panel lines 170, a third insulating layer 190, and a common electrode 100CM that can function as touch panel electrodes. The counter substrate 200 includes in the order toward the liquid crystal layer 300 a glass substrate 210, the color filter layer 10CF and the black matrix layer 10BM, and an overcoat layer 220.

In the liquid crystal display device 1R of Comparative Embodiment 2, in order to increase the aperture ratio of pixels, the touch panel lines 170 overlap the source lines 150L disposed at the color boundaries of the color filter layer 10CF. In order to reduce the capacitances (loads) between the source lines 150L and the touch panel lines 170, a resin flattening film 165 is disposed therebetween. When the thickness of the touch panel lines 170 is increased in order to reduce the resistance of the touch panel lines 170 in the liquid crystal display device 1R of Comparative Embodiment 2 in which no resin flattening film is disposed on the liquid crystal layer 300 side of the touch panel lines 170, irregularities on the liquid crystal layer 300 side of the touch panel lines 170 are increased, possibly causing a reduced display quality due to reflection and scattering of light and alignment defects of liquid crystal molecules.

Here, proposed as another example of a liquid crystal display device provided with an in-cell touch panel is a liquid crystal display device of a modified example of Comparative Embodiment 2, in which no resin flattening film is disposed between the source lines 150L and the touch panel lines 170. FIG. 18 is a schematic plan view of a liquid crystal display device of the modified example of Comparative Embodiment 2. In the liquid crystal display device 1R of the modified example of Comparative Embodiment 2, in order to avoid formation of capacitances between the source lines 150L and the touch panel lines 170, the touch panel lines 170 and the source lines 150L are disposed in the same layer and are parallel to each other as shown in FIG. 18. Unfortunately, such a structure is difficult to increase the aperture ratio. Therefore, in the liquid crystal display device 1R of Comparative Embodiment 2, the resin flattening film 165 is disposed between the source lines 150L and the touch panel lines 170 to keep the distance between the source lines 150L and the touch panel lines 170 in the thickness direction of the liquid crystal display device 1R.

Development of liquid crystal display devices is concerned which are provided with an in-cell touch panel and capable of achieving a small reduction in aperture ratio (transmittance) even when the TFT substrate includes a structure for a touch sensor, such as the liquid crystal display device 1R of Comparative Embodiment 2. Unfortunately, curved displays significantly cause color mixing in an oblique view and are thus difficult to achieve high transmittance.

Similarly to Comparative Embodiment 1, the counter substrate 200 of Comparative Embodiment 2 includes the red color filters 10CFR, the green color filters 10CFG, and the blue color filters 10CFB for the respective sub-pixels in order to provide color display. When the width of the black matrix layer 10BM disposed at the color boundaries of the color filters of respective colors is reduced in order to increase the aperture ratio, abnormal color mixing occurs in an oblique direction.

As a countermeasure for color mixing in an oblique view in liquid crystal display devices having a large amount of fitting displacement such as curved displays, the CF on array (COA) technique is known in which a CF layer is formed on the TFT substrate side. FIG. 19 is a schematic cross-sectional view of a liquid crystal display device of Comparative Embodiment 3. FIG. 20 is a schematic cross-sectional view of a liquid crystal display device of Comparative Embodiment 4. As shown in FIG. 19, the liquid crystal display device 1R of Comparative Embodiment 3 includes the color filter layer 10CF on the counter substrate 200 side. Thus, in an oblique view with light transmitted through a green color filter, the light L from the green sub-pixel 10PG is not blocked by the black matrix layer 10BM, passes through the blue color filter 10CFB disposed in the blue sub-pixel 10PB, and leaks to the viewing surface side as blue light, resulting in color mixing in an oblique view.

As shown in FIG. 20, in the liquid crystal display device 1R of Comparative Embodiment 4 using the COA technique, the color filter layer 10CF is disposed on the TFT substrate 100 side. Thus, in an oblique view with light transmitted through a green color filter, green light having passed through the green color filter 10CFG disposed in the green pixel 10PG is observed on the viewing surface side, preventing color mixing in an oblique view. As described, use of the COA technique eliminates the need for increasing the width of the black matrix layer 10BM for preventing color mixing in an oblique view and can reduce or prevent color mixing in an oblique view while reducing or preventing a reduction in transmittance.

Unfortunately, when the thickness of the touch panel lines 170 is increased in order to reduce the resistance of the touch panel lines 170 in the liquid crystal display device 1R of Comparative Embodiment 4 in which no resin flattening film is disposed on the liquid crystal layer 300 side of the touch panel lines 170, irregularities on the liquid crystal layer 300 side of the touch panel lines 170 are increased, possibly causing a reduced display quality due to reflection and scattering of light and alignment defects of liquid crystal molecules.

None of Patent Literatures 1 to 4 discuss prevention or reduction of color mixing in an oblique view while reducing or preventing a reduction in transmittance and prevention or reduction of the display quality in a liquid crystal display device provided with an in-cell touch panel.

The present invention has been made under the current situation in the art and aims to provide a liquid crystal display device provided with an in-cell touch panel, capable of reducing or preventing color mixing in an oblique view while reducing or preventing a reduction in transmittance, and of reducing or preventing a reduction in display quality.

(1) One embodiment of the present invention is directed to a liquid crystal display device including: a first substrate; a second substrate facing the first substrate; and a liquid crystal layer between the first substrate and the second substrate; the first substrate including: a thin-film transistor; a pixel electrode connected to the thin-film transistor; a color filter layer including color filters of multiple colors; a touch panel line on a liquid crystal layer side of the color filter layer; and a flattening film on a liquid crystal layer side of the touch panel line.

(2) In an embodiment of the present invention, the liquid crystal display device includes the structure (1), the liquid crystal display device is provided with a first contact hole penetrating through at least the flattening film, the color filter layer is disposed in a region excluding at least a region overlapping the first contact hole, and the pixel electrode is disposed on a liquid crystal layer side of the flattening film and is connected to a drain electrode of the thin-film transistor through the first contact hole.

(3) In an embodiment of the present invention, the liquid crystal display device includes the structure (1) or (2), the liquid crystal display device further includes a touch panel electrode on a liquid crystal layer side of the flattening film, the liquid crystal display device is provided with a second contact hole penetrating through at least the flattening film, the touch panel line is connected to the touch panel electrode through the second contact hole, and the color filter layer is disposed on a region excluding at least a region overlapping a contact region where the touch panel line is in contact with the touch panel electrode.

(4) In an embodiment of the present invention, the liquid crystal display device includes the structure (1), the liquid crystal display device further includes a touch panel electrode on a liquid crystal layer side of the flattening film, the liquid crystal display device is provided with a first contact hole penetrating through at least the flattening film and a second contact hole penetrating through at least the flattening film, the touch panel line is connected to the touch panel electrode through the second contact hole, the color filter layer is not disposed in a continuous region including a region overlapping the first contact hole and a region overlapping a contact region where the touch panel line is in contact with the touch panel electrode, and the pixel electrode is disposed on a liquid crystal layer side of the flattening film and connected to a drain electrode of the thin-film transistor through the first contact hole.

(5) In an embodiment of the present invention, the liquid crystal display device includes the structure (4), the first substrate includes a spacer protruding toward the second substrate, and the spacer is entirely overlapped with the continuous region without the color filter layer.

(6) In an embodiment of the present invention, the liquid crystal display device includes the structure (1), (2), (3), (4), or (5), the touch panel line is disposed at a boundary of the color filters of different colors of the color filter layer.

(7) In an embodiment of the present invention, the liquid crystal display device includes the structure (6), the first substrate further includes a line connected to the thin-film transistor, and the line overlaps the touch panel line and is disposed at the boundary of the color filters.

(8) In an embodiment of the present invention, the liquid crystal display device includes the structure (1), (2), (3), (4), (5), (6), or (7), the touch panel line has a wider line width in a portion on or above an uneven portion at an end of at least one of the color filters of multiple colors of the color filter layer.

Advantageous Effects of Invention

The present invention allows a liquid crystal display device provided with an in-cell touch panel to reduce or prevent color mixing in an oblique view while reducing or preventing a reduction in transmittance and to reduce or prevent a reduction in display quality.

BRIEF DESCRIPTION OF THE DRAWINGS

FIG. 2A is a schematic cross-sectional view taken along the line A1-A2 in FIG. 1.

DETAILED DESCRIPTION OF THE INVENTION

Hereinafter, embodiments of the present invention are described. The embodiments, however, are not intended to limit the scope of the present invention. The designs in the embodiments may appropriately be modified within the spirit of the present invention. The configurations in the embodiments may appropriately be combined or modified within the spirit of the present invention.

Embodiment

Figure 1:
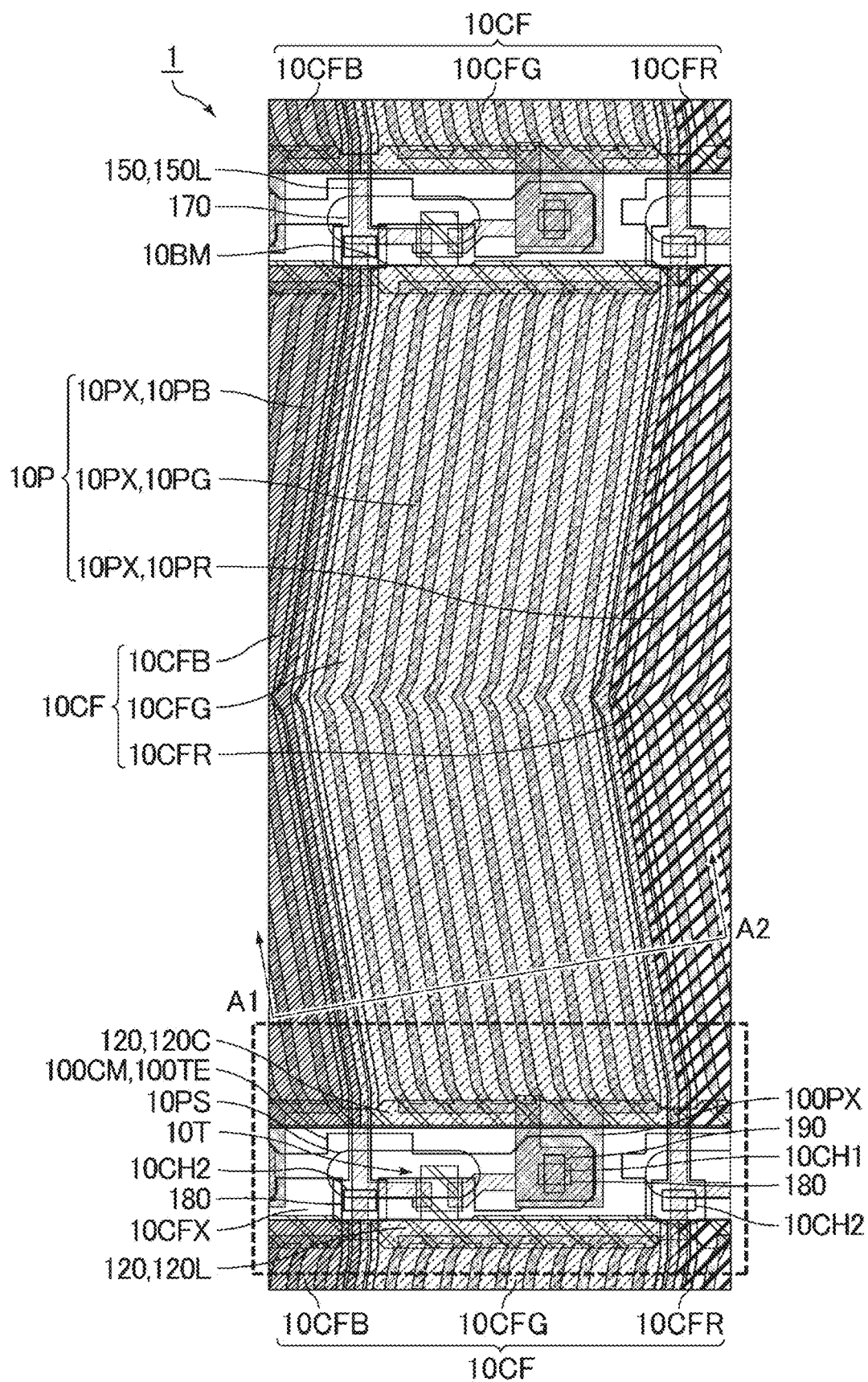
FIG. 1 is a schematic plan view of a pixel of a liquid crystal display device of Embodiment.
Figure 2B:
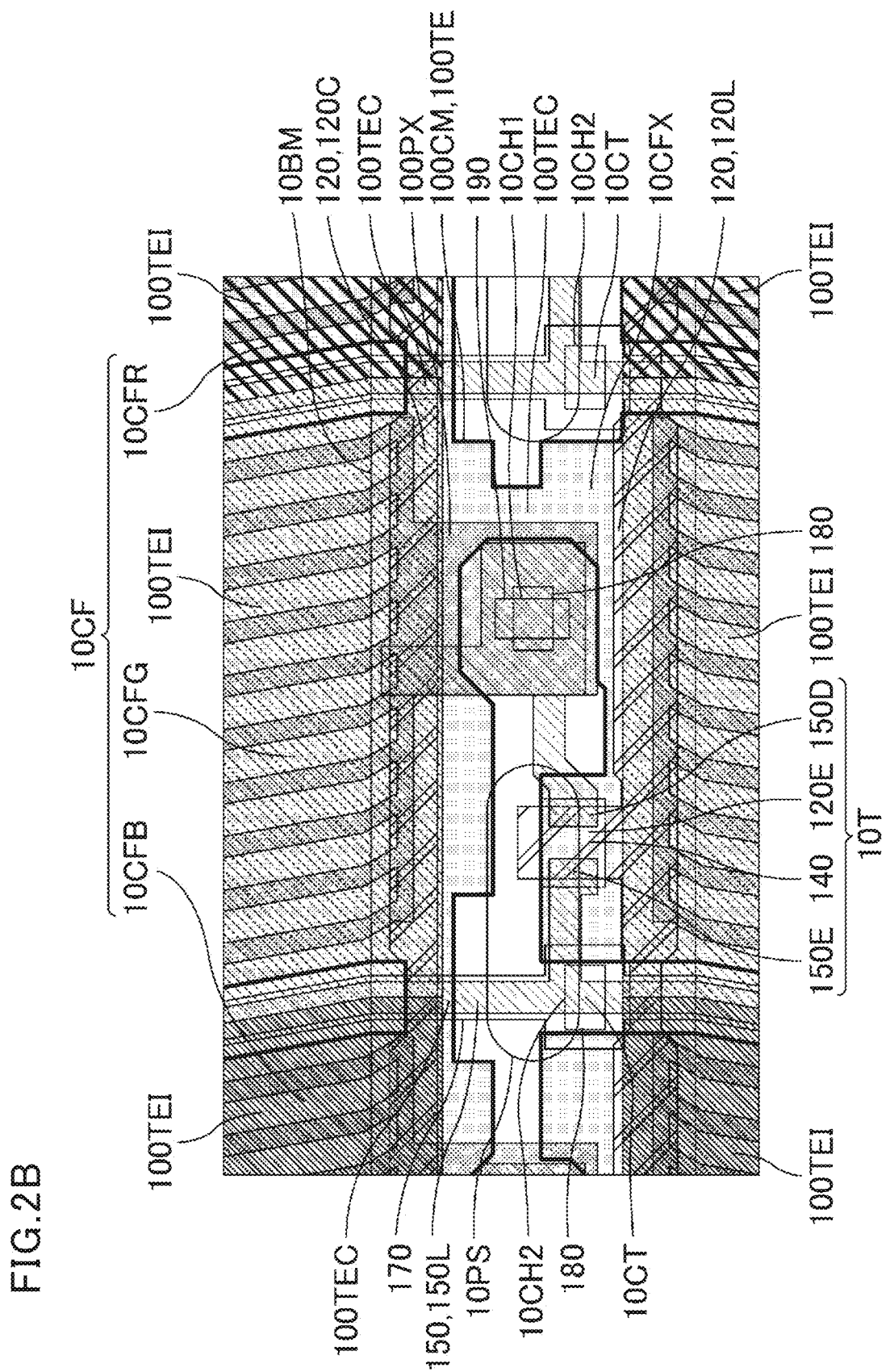
FIG. 2B is an enlarged schematic plan view showing a region surrounded by the dotted line in FIG. 1.

FIG. 1 is a schematic plan view of a pixel of a liquid crystal display device of Embodiment. FIG. 2A is a schematic cross-sectional view taken along the line A1-A2 in FIG. 1. FIG. 2B is an enlarged schematic plan view showing a region surrounded by the dotted line in FIG. 1. As shown in FIG. 1, FIG. 2A, and FIG. 2B, a liquid crystal display device 1 of Embodiment includes the TFT substrate 100 including thin-film transistors (TFTs) 10T as the first substrate, the counter substrate 200 facing the TFT substrate 100 as the second substrate, and the liquid crystal layer 300 between the TFT substrate 100 and the counter substrate 200. The liquid crystal display device 1 further includes a first polarizing plate on the side remote from the liquid crystal layer 300 of the TFT substrate 100 and a second polarizing plate on the side remote from the liquid crystal layer 300 of the counter substrate 200. The polarization axis of the first polarizing plate and the polarization axis of the second polarizing plate are perpendicular to each other. The liquid crystal display device 1 further includes a backlight on the side remote from the liquid crystal layer 300 of the first polarizing plate.

The liquid crystal display device 1 is provided with an active area (image-displaying region) for providing images. The active area includes multiple pixels 10P arranged in a matrix in the row direction (horizontal direction (direction X) of the screen) and in the column direction (vertical direction (direction Y) of the screen).

The TFT substrate 100 includes on the liquid crystal layer 300 side surface of the glass substrate 110 parallel gate lines 120L extending in the row direction, auxiliary capacitor lines 120C being parallel to the gate lines 120L, and parallel source lines 150L extending in the column direction and intersecting the gate lines 120L via the first insulating layer 130. The gate lines 120L and the source lines 150L are arranged in a grid pattern as a whole so as to define respective sub-pixels 10PK. The TFTs 10T are disposed at the respective intersections of the gate lines 120L and the source lines 150L. Each TFT 10T is connected to the corresponding gate line 120L and source line 150L.

The TFT substrate 100 includes in the order toward the liquid crystal layer 300 the glass substrate 110, a gate line layer (first line layer) 120 provided with the gate lines 120L and the auxiliary capacitor lines 120C, the first insulating layer (gate insulating layer) 130, a source line layer (second line layer) 150 provided with the source lines 150L, the second insulating layer 160, the color filter (CF) layer 10CF, a third line layer provided with the touch panel lines 170, a flattening film 180, the common electrode 100CM, the third insulating layer 190, pixel electrodes 100PX provided with slits, and spacers 10PS. The present embodiment describes the case where the pixel electrodes 100PX are disposed on the common electrode 100CM via the third insulating layer 190. Still, the stacking order of the common electrode 100CM and the pixel electrodes 100PX is not limited to this, and the common electrode 100CM may be disposed on the pixel electrodes 100PX via the third insulating layer 190. The pixel electrodes 100PX and the common electrode 100CM may be both comb-teeth electrodes and may be disposed in the same electrode layer such that the comb teeth of the pixel electrodes 100PX, which are comb-teeth electrodes, and the comb teeth of the common electrode 100CM, which is also a comb-teeth electrode, fit each other.

The color filter layer 10CF is disposed on the liquid crystal layer 300 side of the TFTs 10T. The color filter layer 10CF includes the red color filters 10CFR, the blue color filters 10CFB, and the green color filters 10CFG. Each pixel 10P includes three sub-pixels 10PX, i.e., the red sub-pixel 10PR provided with the red color filter 10CFR, the blue sub-pixel 10PB provided with the blue color filter 10CFB, and the green sub-pixel 10PG provided with the green color filter 10CFG, in a stripe pattern.

The common electrode 100CM also functions as touch panel electrodes 100TE. The touch panel electrodes 100TE are divisions of the common electrode 100CM.

The pixel electrodes 100PX are disposed in the respective regions surrounded by two adjacent gate lines 120L and two adjacent source lines 150L, i.e., in the respective sub-pixels 10PX, are each connected to the corresponding TFT 10T, and are each connected to the corresponding source line 150L via the thin film semiconductor layer of the TFT 10T.

The counter substrate 200 includes in the order toward the liquid crystal layer 300 the glass substrate 210, the black matrix layer, and the overcoat layer 220.

The liquid crystal layer 300 includes liquid crystal molecules horizontally aligned with no-voltage applied. The expression "liquid crystal molecules are horizontally aligned" means that with no-voltage applied to the liquid crystal layer 300 (when the voltage applied to the liquid crystal layer 300 is less than the threshold voltage), liquid crystal molecules in the liquid crystal layer 300 are substantially parallel to the main surfaces of the TFT substrate 100 and the counter substrate 200. The expression "liquid crystal molecules are substantially parallel to the main surface of a substrate" means that the pre-tilt angle of the liquid crystal molecules is 0° to 5°, preferably 0° to 2°, more preferably 0° to 1°, with respect to the main surface of the substrate. The pre-tilt angle of liquid crystal molecules indicates the angle of the major axes of the liquid crystal molecules inclining to the main surface of the substrate with no-voltage applied to the liquid crystal layer. Herein, a voltage applied state in which voltage is applied between the common electrode and the pixel electrodes is also simply referred to as "voltage applied state", and a no-voltage applied state in which voltage is not applied between the common electrode and the pixel electrodes is simply referred to as "no-voltage applied state" or "with no-voltage applied".

Figure 3:
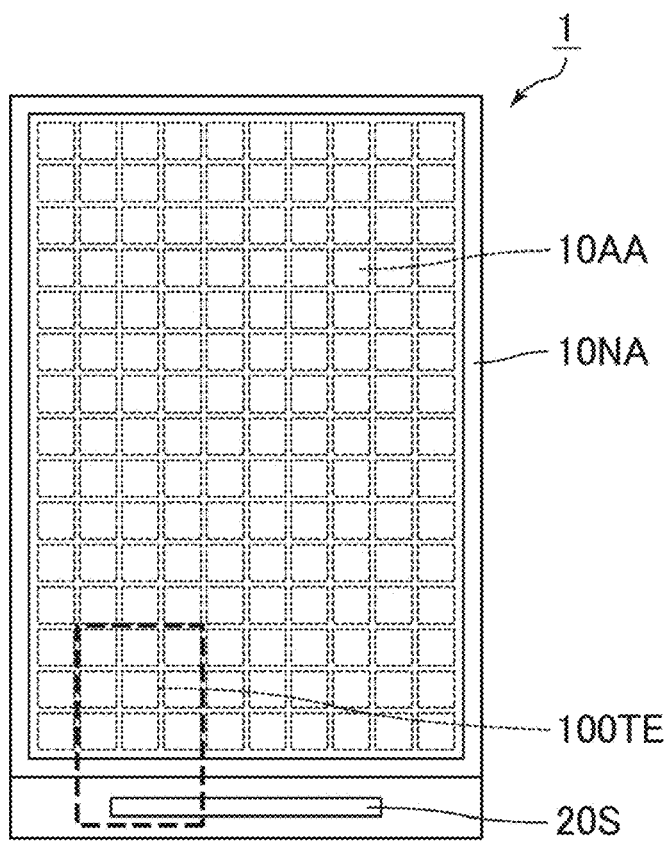
FIG. 3 is a schematic plan view of the liquid crystal display device of Embodiment.
Figure 4:
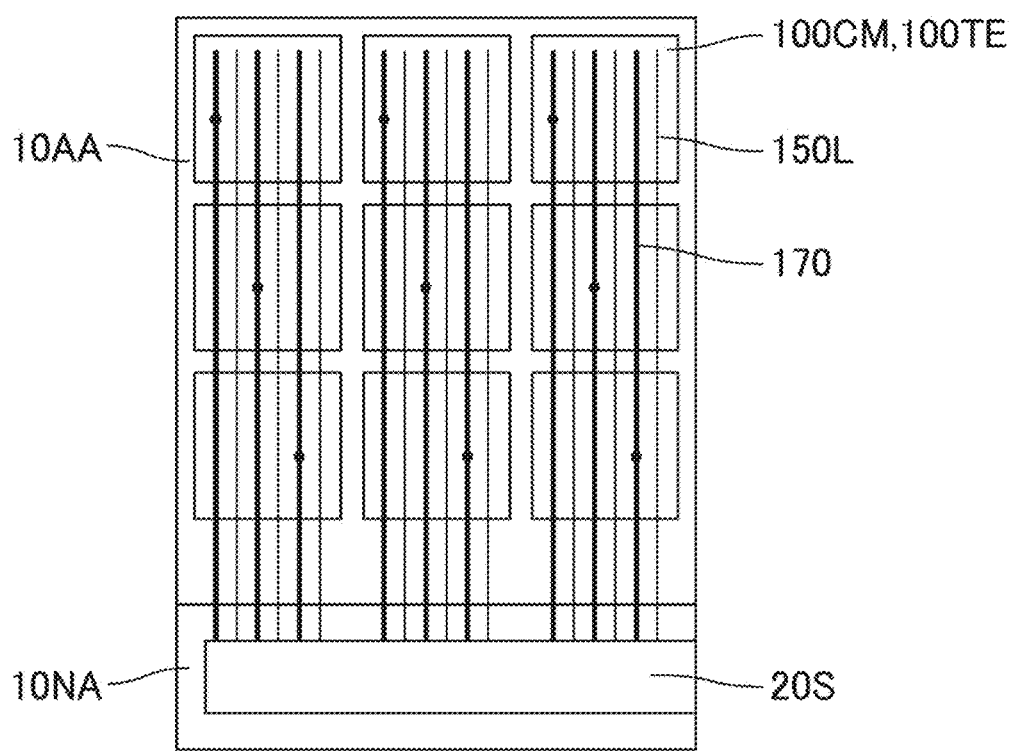
FIG. 4 is an enlarged schematic plan view of a region surrounded by the dotted line in FIG. 3.
Figure 5:
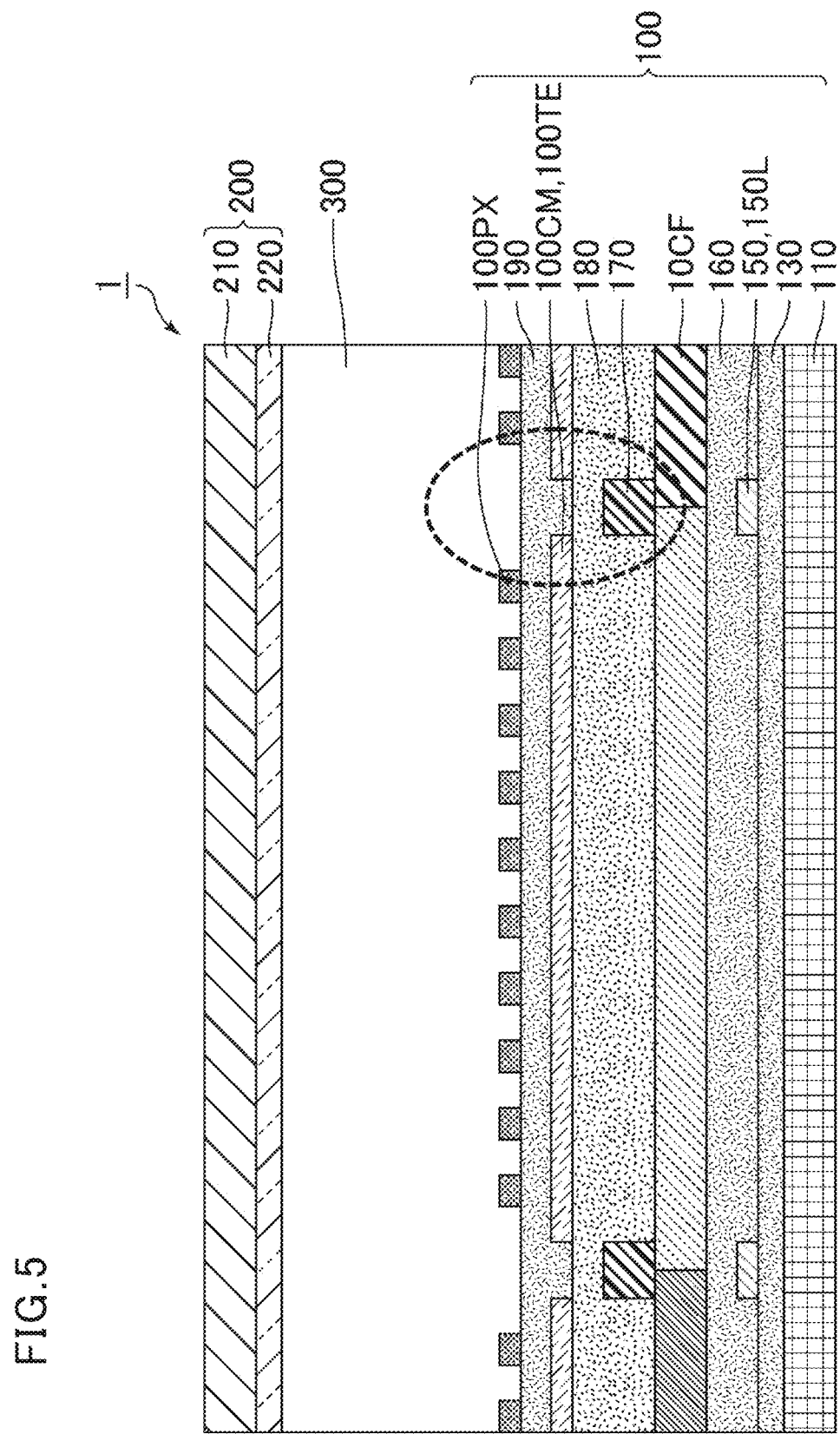
FIG. 5 is a schematic cross-sectional view of the liquid crystal display device of Embodiment, in which the thickness of touch panel lines is increased.
Figure 6:
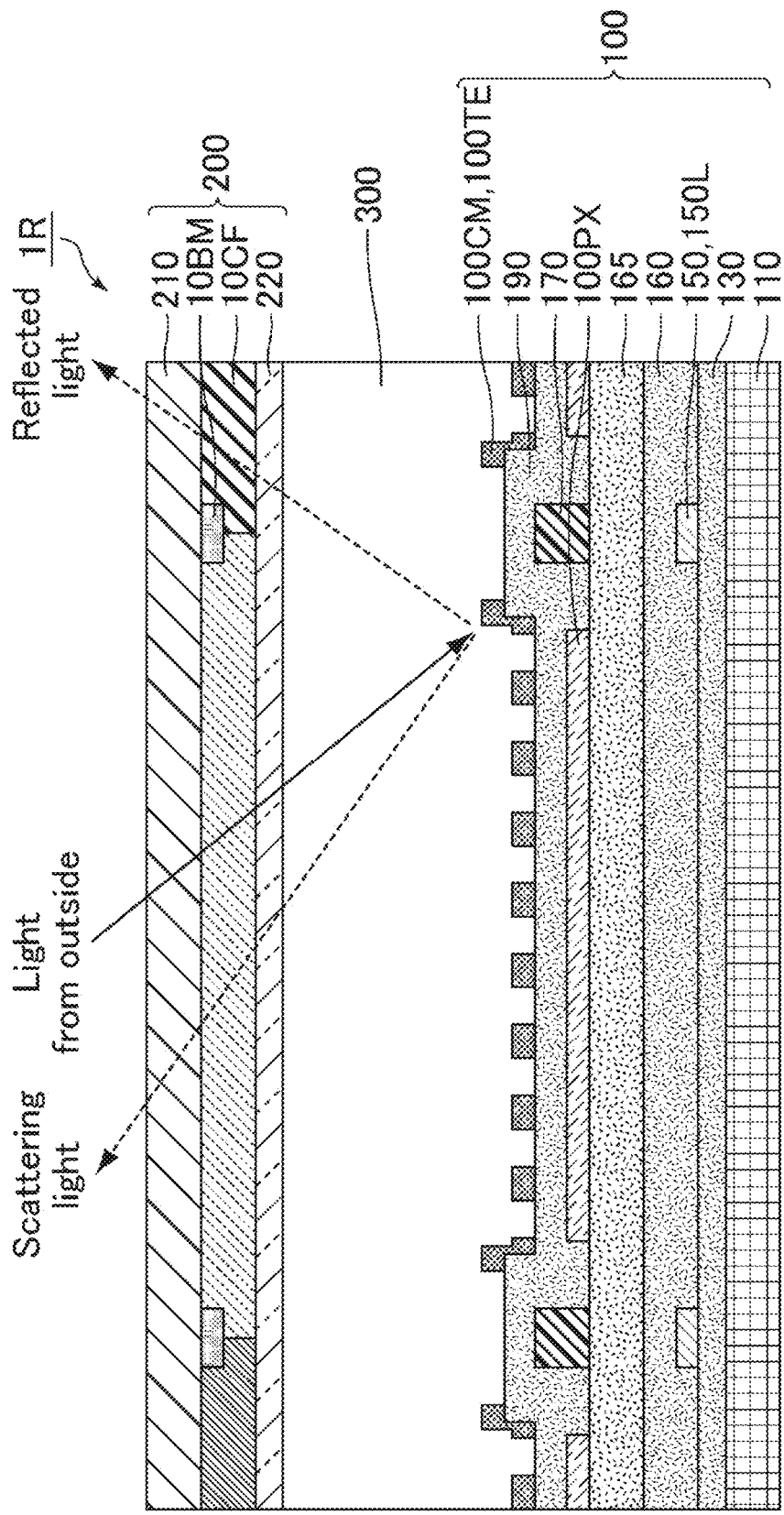
FIG. 6 is a schematic cross-sectional view of a liquid crystal display device of Comparative Embodiment 2, in which the thickness of touch panel lines is increased.

FIG. 3 is a schematic plan view of the liquid crystal display device of Embodiment. FIG. 4 is an enlarged schematic plan view of a region surrounded by the dotted line in FIG. 3. FIG. 5 is a schematic cross-sectional view of the liquid crystal display device or Embodiment, in which the thickness of touch panel lines is increased. FIG. 6 is a schematic cross-sectional view of a liquid crystal display device of Comparative Embodiment 2, in which the thickness of touch panel lines is increased.

As shown in FIG. 3 and FIG. 4, the liquid crystal display device 1 includes a display region 10AA for providing images and a non-display region 10NA around the display region 10AA. The liquid crystal display device 1 includes a self-capacitance in-cell touch panel. The display region 10AA is provided with the touch panel electrodes 100TE and the touch panel lines 170. The touch panel electrodes 100TE are arranged in a pattern like tile pavement (in a matrix). The touch panel electrodes 100TE each include multiple sub-pixel corresponding portions 100TEI which are disposed in the respective sub-pixels 10PX and are connected to each other as shown in FIG. 2B. Each of the sub-pixel corresponding portions constituting the touch panel electrode 100TE is connected to an adjacent sub-pixel corresponding portion(s) 100TEI through a connection portion 100TEC. The resolution of the touch panel electrodes 100TE is lower than the resolution of the sub-pixels 10PX. Each touch panel line 170 is connected to one of the touch panel electrodes 100TE. The black dots shown in FIG. 4 indicate contact parts where the touch panel lines 170 and the touch panel electrodes 100TE are connected. The non-display region 10NA includes a driver 20S connected to the source lines 150L and the touch panel lines 170. The driver 20S is formed from an IC chip.

The touch panel electrodes 100TE are divisions of the common electrode and are electrodes for applying a common voltage to the sub-pixels 10PX. During a writing period in which display signals for display are written to the sub-pixels, the electrodes function as the common electrode 100CM so as to have a pixel standard potential (common voltage). During a sensing period in which no display signals are written (gate scanning is not performed), the electrodes function as the touch panel electrodes 100TE. Each touch panel electrode 100TE connected to one of the touch panel lines 170. During the sensing period, a sensing signal is input to the touch panel electrode 100TE from the driver 20S through the touch panel line 170. Examples of the sensing signal include a touch signal that is a pulse signal for detecting the change in electrostatic capacitance in each touch panel electrode 100TE. In the present embodiment, the number of touch panel lines 170 connected to each touch panel electrode 100TE is one. Still, the number of touch panel lines 170 connected to each touch panel electrode 100TE is not limited to this and may be two or more. For example, as a redundant design in preparation for open circuit of the touch panel line(s) 170, two touch panel lines may be connected to each touch panel electrode 100TE.

The liquid crystal display device 1 includes a gate driver connected to the gate lines 120L, the driver 20S, and a controller connected to the gate driver and the driver 20S. The gate driver sequentially supplies the gate lines 120L with scanning signals based on the control by the controller. During the writing period, the driver 20S supplies each source line 150L with a data signal based on the control by the controller at the timing where the corresponding TFT 10T is turned into a voltage applied state by a scanning signal. The pixel electrodes 100PX are each set to have a potential in response to the data signal supplied through the corresponding TFT 10T. Then, a fringe electric field is generated between the common electrode 100CM and the pixel electrodes 100PX, whereby liquid crystal molecules in the liquid crystal layer 300 are rotated. In such a manner, the magnitude of the voltage applied between the common electrode 100CM and the pixel electrodes 100PX is controlled and thereby the retardation of the liquid crystal layer 300 is changed to control transmittance or non-transmittance of light. The liquid crystal display device 1 of the present embodiment is a fringe field switching (FFS) mode liquid crystal display device. During the sensing period, a touch signal is applied from the driver 20S to each touch panel electrode 100TE through the corresponding touch panel line 170, and the change in electrostatic capacitance is detected by the driver 20S, whereby the presence or absence of the contact and/or approach of a pointer or finger is detected. Also, the driver 20S functions as a source driver for supplying the source lines 150L with data signals and functions as a driver for a touch sensor for supplying the touch panel lines 170 with touch signals.

As shown in FIG. 2A, the TFT substrate 100 includes the color filter layer 10CF including color filters of multiple colors (the red color filters 10CFR, the green color filters 10CFG, and the blue color filters 10CFB). Thus, application of the CF on array (COA) structure in which the color filter layer 10CF is disposed on the TFT substrate 100 side allows light from the back surface side of the liquid crystal display device 1 to pass through the color filter layer 10CF before passing through the liquid crystal layer 300. Accordingly, even in an oblique view of a lighted sub-pixel, light having passed through the color filter of the lighted sub-pixel passes through the liquid crystal layer 300 and is then observed, which can reduce or prevent color mixing in an oblique view. In addition, use of the COA technique eliminates the need for increasing the width of the black matrix layer for reducing or preventing color mixing in an oblique view, which can prevent a reduction in transmittance (aperture ratio). In other words, the liquid crystal display device is capable of reducing or preventing color mixing in an oblique view while reducing or preventing a reduction in transmittance.

Also, the TFT substrate 100 includes the color filter layer 10CF including color filters of multiple colors, the touch panel lines 170 on the liquid crystal layer 300 side of the color filter layer 10CF, and the flattening film 180 on the liquid crystal layer 300 side of the touch panel lines 170. In such an embodiment, even when the thickness of the touch panel lines 170 is increased in order to reduce the resistance as shown in FIG. 5, the flattening film 180 is disposed closer to the liquid crystal layer 300 than the touch panel lines 170 are, and thus irregularities on the liquid crystal layer 300 side surface of the TFT substrate 100 are reduced as shown in the region surrounded by the dotted line in FIG. 5, reducing or preventing reflection and scattering of light caused by the irregularities and alignment defects of the liquid crystal layer 300 caused by the irregularities. As a result, a reduction in display quality can be reduced or prevented. In contrast, when the thickness of the touch panel lines 170 is increased in order to reduce the resistance of the touch panel lines 170 in the liquid crystal display device 1R of Comparative Embodiment 2 as shown in FIG. 6, irregularities on the liquid crystal layer 300 side of the touch panel lines 170, where no flattening film is present, are increased to possibly cause a reduction in display quality or alignment defects due to reflection and scattering of light.

In other words, the present embodiment employs the COA structure in which the color filter layer 10CF is disposed on the TFT substrate 100 side and thus can reduce or prevent color mixing while reducing or preventing a reduction in transmittance even in a liquid crystal display device having a large amount of fitting displacement between substrates, such as a curved display. Also, the touch panel lines 170 are disposed between the color filter layer 10CF and the flattening film 180 in a cross-sectional view. Thus, even when the thickness of the touch panel lines 170 is increased in order to reduce the resistance, the flatness of a portion contributing to display can be ensured by the flattening film 180, preventing a reduction in display quality.

WO 2018/225645 discloses in Embodiment 3 a structure in which the COA technique is applied to a liquid crystal display device provided with an in-cell touch panel, in which pixel electrodes, touch panel lines, and touch panel electrodes are separately disposed in different layers via insulating films. In Embodiment 3 of WO 2018/225645, no flattening film is disposed on the color filter layer or on the touch panel lines. Thus, the flatness of a portion (along the source lines) contributing to display cannot be ensured.

The liquid crystal display device of Embodiment 3 of WO 2018/225645 includes in the order from the liquid crystal layer side touch panel electrodes (a common electrode), an insulating film, pixel electrodes, an insulating film, touch panel lines, a color filter layer, and an organic resin film that can function as a flattening film. In contrast, the liquid crystal display device 1 of the present embodiment includes in the order from the liquid crystal layer 300 side the pixel electrodes 100PX, the third insulating layer 190, the touch panel electrodes 100TE, the flattening film 180, the touch panel lines 170, and the color filter layer 10CF, which is a different structure from that in Embodiment 3 of WO 2018/225645.

The paragraph 0047 in WO 2018/225645 describes a structure in which touch panel lines are disposed in a layer below a color filter layer. This structure is also different from the structure of the liquid crystal display device 1 of the present embodiment in the positional relation between the flattening film and the color filter layer.

As a countermeasure for color mixing in a curved display, the COA technique is known in which CFs are disposed on the TFT substrate (array substrate) side. In the present embodiment, for application of the COA technique to an in-cell panel, the arrangement of lines and electrode layers and the shape of the CF layer in a plan view have unique features. The present embodiment is specifically described hereinbelow.

Lines and electrodes for forming the gate lines 120L, the auxiliary capacitor lines 120C, the source lines 150L, and the TFTs 10T may be produced by forming a single- or multi-layer film from a metal such as copper, titanium, aluminum, molybdenum, or tungsten or an alloy of these by sputtering or the like and then patterning the film by photolithography or the like. Lines and electrodes to be formed in the same layer may be formed from the same material, which enables efficient production.

The first insulating layer 130 is a gate insulating layer. The first insulating layer 130 is, for example, an inorganic insulating film. Examples of the inorganic insulating film include inorganic films (relative permittivity $\varepsilon=5$ to 7) such as a film of silicon nitride (SiNx) and a film of silicon oxide (SiO$_2$) and multilayer films thereof.

The second insulating layer 160 is, for example, an inorganic insulating film. Examples of the inorganic insulating film include inorganic films (relative permittivity $\varepsilon=5$ to 7) such as a film of silicon nitride (SiNx) and a film of silicon oxide (SiO$_2$) and multilayer films thereof.

The touch panel lines 170 may be produced by forming a single- or multi-layer film from a metal such as copper, titanium, aluminum, molybdenum, or tungsten or an alloy of these by sputtering or the like and then patterning the film by photolithography or the like.

The touch panel lines 170 are each disposed at the boundary of the color filters of different colors (color boundaries) of the color filter layer 10CF. The color boundary usually corresponds to a light-shielding portion defined by the black matrix layer 10BM. Thus, disposing the touch panel line 170 at the color boundary can prevent a reduction in aperture ratio.

Each touch panel line 170 overlaps one of the source lines 150L and extends in the column direction. In other words, each source line 150L connected to the TFT 10T overlaps one of the touch panel lines 170 and is disposed at the boundary of the color filters (color boundary). Such an embodiment can increase the aperture ratio of each pixel 10P.

The flattening film 180 is an insulating film that absorbs irregularities of a surface (underlayer) on which the flattening film 180 is to be formed and flattens the surface of a substrate on which the flattening film 180 is formed, and is preferably an organic insulating film. Examples of the organic insulating film include organic films such as a film of acrylic resin, a film of polyimide resin, and a film of novolac resin. The organic insulating film is preferably an organic film width a small relative permittivity (relative permittivity $\varepsilon=2$ to 5), such as a film of a photosensitive acrylic resin.

The pixel electrodes 100PX and the common electrode 100CM can be produced by, for example, forming a single- or multi-layer film from a transparent conductive material such as indium tin oxide (ITO), indium zinc oxide (IZO), zinc oxide (ZnO), or tin oxide (SnO) or an alloy of these by sputtering or the like and then patterning the film by photolithography or the like.

The third insulating layer 190 is an interlayer insulating film and has a function of insulating the common electrode 100CM from the pixel electrodes 100PX. The third insulating layer 190 may be an inorganic insulating film. Examples of the inorganic insulating film include inorganic films (relative permittivity $\varepsilon=5$ to 7) such as a film of silicon nitride (SiNx) and a film of silicon oxide ($SiO_2$) and multilayer films thereof.

The overcoat layer 220 flattens the liquid crystal layer 300 side surface of the counter substrate 200 and may be, for example, an organic film (relative permittivity $\varepsilon=3$ to 4). The overcoat layer 220 can be formed by, for example, applying a photo-curable resin to a substrate, irradiating the resin with ultraviolet rays, and baking the resin.

The liquid crystal layer 300 contains a liquid crystal material. Voltage is applied to the liquid crystal layer 300 to change the alignment state of liquid crystal molecules in the liquid crystal material in response to the applied voltage, whereby the amount of light transmitted is controlled. The liquid crystal molecules may have an anisotropy of dielectric constant ($\Delta\varepsilon$) defined by the following formula L1 of a positive value or a negative value. Liquid crystal molecules having a positive anisotropy of dielectric constant are also referred to as positive liquid crystal, and liquid crystal molecules having a negative anisotropy of dielectric constant are also referred to as negative liquid crystal. The major axis direction of liquid crystal molecules corresponds to the direction of the slow axis. Liquid crystal molecules are homogeneously aligned with no-voltage applied (in a no-voltage applied state), and the direction of the major axes of the liquid crystal molecules in the no-voltage applied state is also referred to as the initial alignment direction of the liquid crystal molecules.

$\Delta\varepsilon$=(dielectric constant in the major axis direction of liquid crystal molecules)–(dielectric constant in the minor axis direction of liquid crystal molecules) (formula L1)

A first alignment layer and a second alignment layer, which control the alignment of the liquid crystal molecules in the liquid crystal layer 300, are respectively disposed between the TFT substrate 100 and the liquid crystal layer 300 and between the counter substrate 200 and the liquid crystal layer 300. The first alignment layer and the second alignment layer are horizontal alignment films and have a function of aligning the liquid crystal molecules in the liquid crystal layer 300 to be substantially parallel to the main surfaces of the TFT substrate 100 and the main surfaces of the counter substrate 200, respectively, with no-voltage applied to the liquid crystal layer 300 (when the voltage applied to the liquid crystal layer 300 is less than the threshold voltage).

Figure 7:
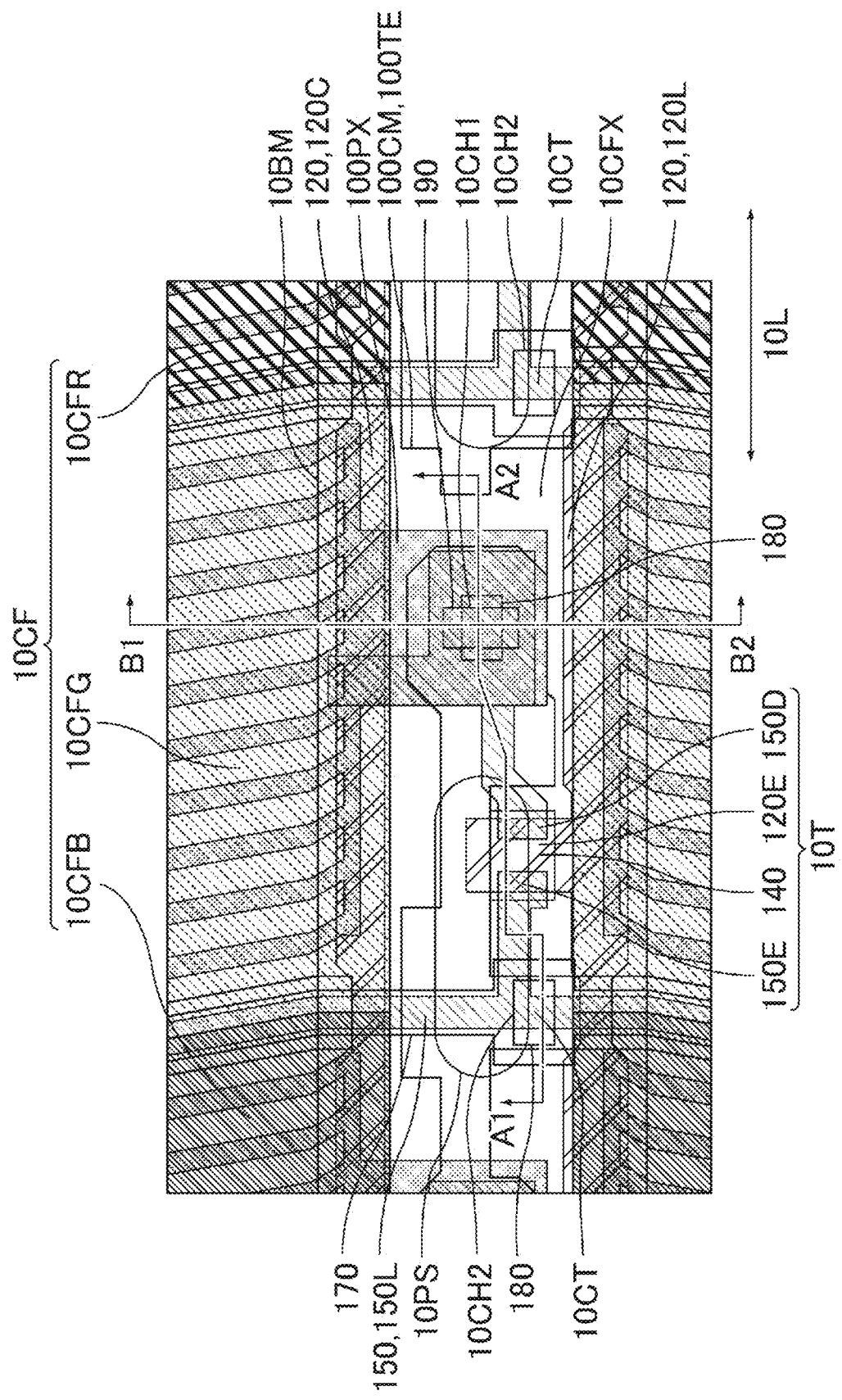
FIG. 7 is a schematic plan view of the liquid crystal display device of Embodiment, showing a sub-pixel boundary region.
Figure 8:
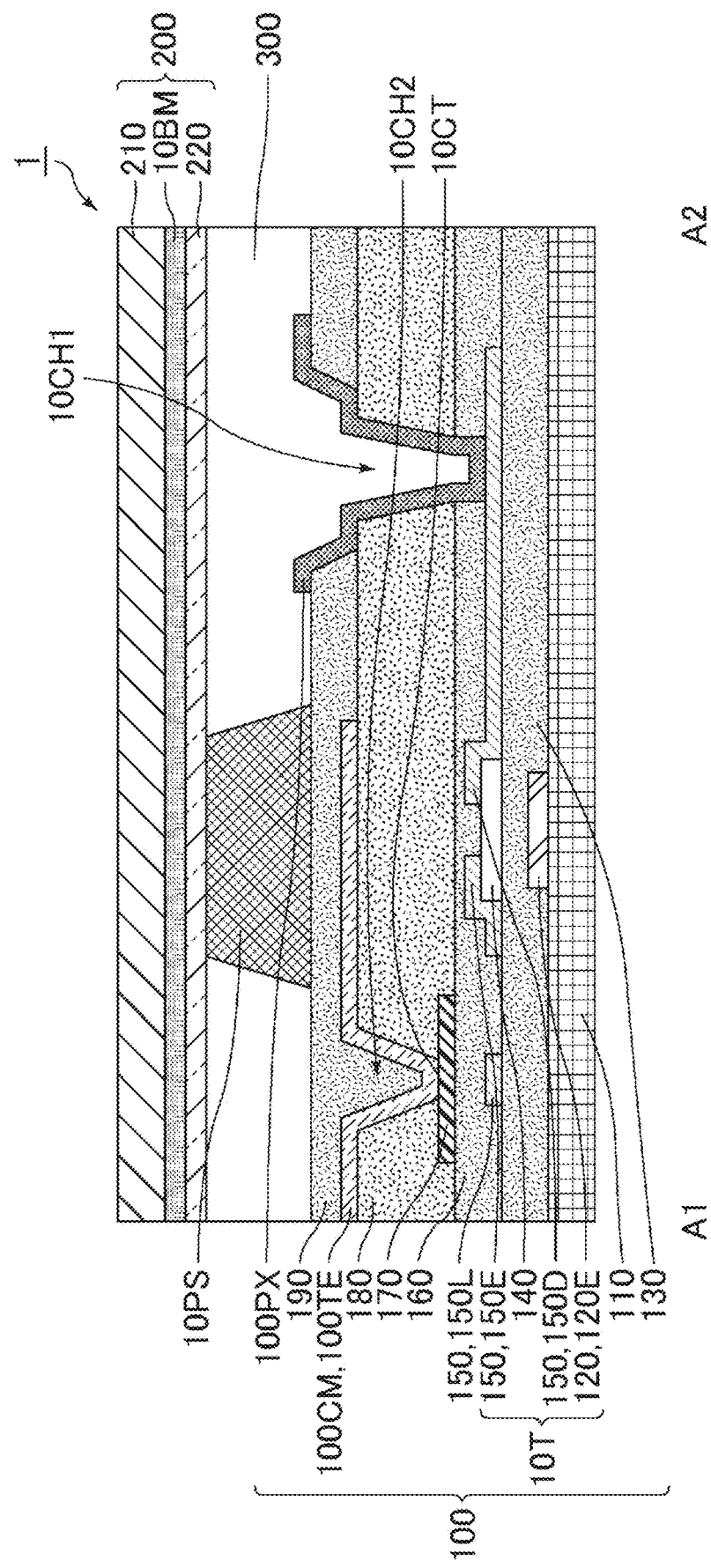
FIG. 8 is a schematic cross-sectional view taken along the line A1-A2 in FIG. 7.
Figure 9:
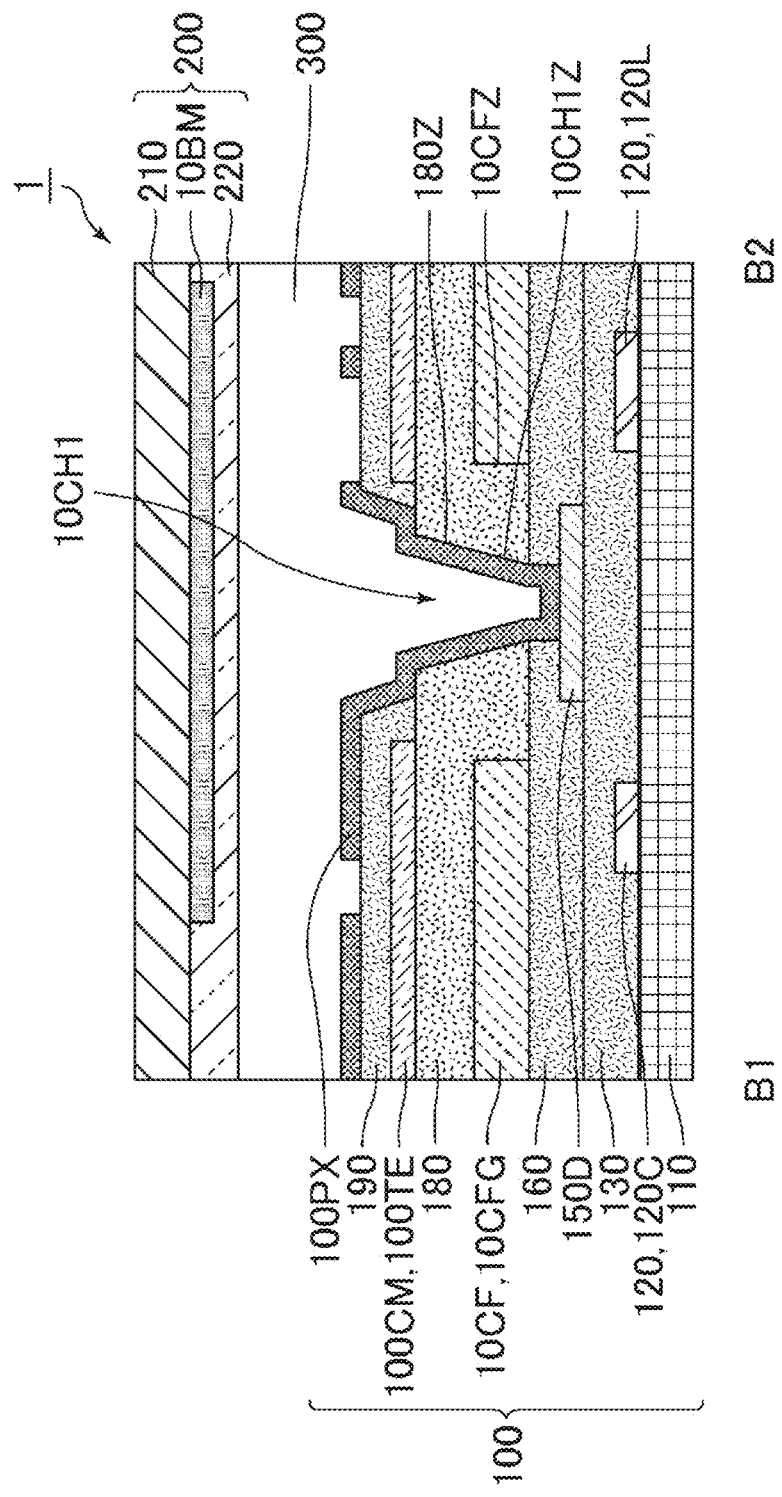
FIG. 9 is a schematic cross-sectional view taken along the line B1-B2 in FIG. 7.

FIG. 7 is a schematic plan view of the liquid crystal display device of Embodiment, showing a sub-pixel boundary region. FIG. 8 is a schematic cross-sectional view taken along the line A1-A2 in FIG. 7. FIG. 9 is a schematic cross-sectional view taken along the line B1-B2 in FIG. 7.

As shown in FIG. 7 to FIG. 9, the liquid crystal display device 1 of the present embodiment includes the TFTs 10T, the source lines 150L connected to the TFTs 10T, the color filter layer 10CF formed on the source lines 150L, the flattening film 180 formed on the color filter layer 10CF, the touch panel electrodes 100TE being divisions of the common electrode 100CM and formed on the flattening film 180, the third insulating layer 190 formed on the touch panel electrodes 100TE, the pixel electrodes 100PX formed on the third insulating layer 190 and connected to the TFTs 10T, and the touch panel lines 170 connected to the touch panel electrodes 100TE. The color filter layer 10CF includes the red color filters 10CFR, the green color filters 10CFG, and the blue color filters 10CFB. Furthermore, in the liquid crystal display device 1, the touch panel lines 170 are each disposed at a color boundary of the color filter layer 10CF between the color filter layer 10CF and the flattening film 180 in a cross-sectional view. Also, an absent portion 10CFX of the color filter layer 10CF is disposed in a continuous region including a connecting portion of a TFT 10T and a pixel electrode 100PX (a first contact hole 10CH1) and a connecting portion of a touch panel line 170 and a touch panel electrode 100TE (second contact hole 10CH2).

Each of the TFTs 10T is a three-terminal switch connected to the corresponding source line 150L and gate line 120L among the source lines 150L and the gate lines 120L, and includes a gate electrode 120E protruding from the corresponding gate line 120L (a part of the gate line 120L), a source electrode 150E protruding from the corresponding source line 150L (a part of the source line 150L), a drain electrode 150D connected to the corresponding pixel electrode 100PX among the pixel electrodes 100PX, and a thin film semiconductor layer 140 disposed between the first insulating layer 130 and the source line layer 150. The gate electrode 120E is disposed in the same layer as for the gate line 120L (gate line layer 120), and the source electrode 150E and the drain electrode 150D are disposed in the same layer as for the source line 150L (source line layer 150).

The thin film semiconductor layer 140 constituting the TFT 10T includes a highly resistant semiconductor layer containing, for example, amorphous silicon, polysilicon, or the like and a low resistant semiconductor layer containing n+ amorphous silicon in which amorphous silicon is doped with an impurity such as phosphorus. The thin film semiconductor layer 140 may be an oxide semiconductor layer containing zinc oxide or the like.

As shown in FIG. 7 to FIG. 9, the TFT substrate 100 of the liquid crystal display device 1 is provided with the first contact hole 10CH1 penetrating through the flattening film 180 and the third insulating layer 190. The color filter layer 10CF is disposed in a region excluding at least a region overlapping the first contact hole 10CH1. Each pixel electrode 100PX is connected to the drain electrode 150D of the corresponding TFT 10T through the first contact hole 10CH1. In this embodiment, the first contact hole 10CH1 has no uneven portion generated by the color filter layer 10CF, and the TFT 10T is stably connected to the pixel electrode 100PX, whereby line connection failures can be reduced. In other words, in the present embodiment, the drain electrode 150D extending from the TFT 10T is connected to the corresponding pixel electrode 100PX through the first contact hole 10CH1 penetrating through the flattening film 180, and this connecting portion is located in a position without the color filter layer 10CF. Also, in the present embodiment, the depth of the first contact hole 10CH1 can be made smaller than in the case where the color filter layer 10CF is disposed in a region overlapping the first contact hole 10CH1. Thus, the diameter of the first contact hole 10CH1 on the liquid crystal layer 300 side can be reduced to prevent a reduction in aperture ratio.

More specifically, as shown in FIG. 9, the color filter layer 10CF is disposed so as to avoid the entire first contact hole 10CH1. A side wall 10CH1Z of the first contact hole 10CH1 includes a side wall 180Z of the flattening film 180 but does not include a side wall 10CFZ of the color filter layer 10CF.

When a contact hole is formed in the state where the connecting portion of the pixel electrode 100PX has the color filter layer 10CF, the height of the connecting portion in the cross-sectional direction (the total of the height of the color filter layer 10CF and the height of the flattening film 180) is excessively large. Therefore, a large contact hole is to be formed in order to reduce connection failures. Such a contact hole having a sufficient connection area for the connecting portion has a mortar shape with a considerably large diameter on the liquid crystal layer 300 side. The inclined part of such a contact hole is difficult to stabilize the alignment of the liquid crystal molecules and thus should be light-shielded, which unfortunately causes a reduction in aperture ratio. Moreover, the inclined part of the contact hole has a boundary between the flattening film 180 and the color filter layer 10CF and may cause connection failures at the boundary.

In a liquid crystal display device provided with the color filter layer 10CF on the TFT substrate 100 side as in Comparative Embodiment 4, the structure of layers on the TFT substrate 100 side is more complicated than a liquid crystal display device provided with the color filter layer 10CF on the counter substrate 200 side and thus may cause line connection failures.

As shown in FIG. 7 and FIG. 8, the TFT substrate 100 of the liquid crystal display device 1 includes the touch panel lines 170, the flattening film 180 disposed on the liquid crystal layer 300 side of the touch panel lines 170, and the touch panel electrodes 100TE disposed on the liquid crystal layer 300 side of the flattening film 180. In such an embodiment, the flattening film 180 is disposed between the touch panel lines 170 and the touch panel electrodes 100TE, and thus the capacitances between the touch panel lines 170 and the touch panel electrodes 100TE can be reduced, improving the sensitivity of the touch sensor.

In contrast, in Embodiment 3 of WO 2018/225645, no organic resin film (flattening film) is disposed on the touch panel lines, and thus the load of the touch panel lines (the capacitances between the touch panel lines and the touch panel electrodes) cannot be reduced.

Additionally, as shown in FIG. 7 and FIG. 8, the TFT substrate 100 of the liquid crystal display device 1 is provided with the second contact holes 10CH2 penetrating through the flattening film 180, each touch panel line 170 is connected to the corresponding touch panel electrode 100TE through one of the second contact holes 10CH2, and the color filter layer 10CF is disposed in a region excluding at least a region overlapping a contact region 10CT where the touch panel line 170 is in contact with the touch panel electrode 100TE. In such an embodiment, the color filter layer 10CF is not disposed below the contact region 10CT for the touch panel line 170 and the touch panel electrode 100TE, and thus the touch panel line 170 can be stably connected to the touch panel electrode 100TE, reducing or preventing line connection failures.

In contrast, in the case where the color filter layer 10CF is disposed in a region overlapping the contact region 10CT where the touch panel line 170 is in contact with the touch panel electrode 100TE, the color filter layer 10CF is disposed below the contact region 10CT where the touch panel line 170 is in contact with the touch panel electrode 100TE. Thus, the touch panel line 170 is unstably connected to the touch panel electrode 100TE, possibly causing line connection failures. In the case where a color boundary of the color filter layer 10CF is located below the contact region 10CT, the touch panel electrode 100TE may not be stably formed due to the influence of the underlayer, possibly reducing the finishing accuracy. Thus, the color boundary of the color filter layer 10CF is to be disposed in a region not below the contact region 10CT in order to avoid this. This structure may fail to provide a design with an optimum aperture ratio.

Also, the color filter layer 10CF is disposed in a region excluding at least a region overlapping the second contact hole 10CH2. In such an embodiment, no color filter layer 10CF is disposed below the touch panel line 170 in the region overlapping the second contact hole 10CH2, and the touch panel line 170 can be formed in this region without being influenced by the color filter layer 10CF, further reducing connection failures between the touch panel line 170 and the touch panel electrode 100TE.

As shown in FIG. 7 to FIG. 9, the color filter layer 10CF is disposed in a region excluding at least a region overlapping the first contact hole 10CH1 and a region overlapping the contact region 10CT where the touch panel line 170 is in contact with the touch panel electrode 100TE. In such an embodiment, the depth of the flattening film 180 in the first contact hole 10CH1 can be substantially the same as the depth of the flattening film 180 in the second contact hole 10CH2. Thus, when the first contact hole 10CH1 and the second contact hole 10CH2 are formed, similar tapered shapes tend to be obtained under the same production conditions. As a result, line connection failures can be further reduced both at the first contact hole 10CH1 and at the second contact hole 10CH2.

As shown in FIG. 7 to FIG. 9, the color filter layer 10CF is not disposed in a continuous region including a region overlapping the first contact hole 10CH1 and a region overlapping the contact region 10CT where the touch panel line 170 is in contact with the touch panel electrode 100TE. In such an embodiment, when each spacer 10PS is entirely overlapped with the continuous region without the color filter layer 10CF as shown in FIG. 7 and FIG. 8, the thickness of the cell can be stabilized. Also, as described later, this enables the color filter layer 10CF to have a simple structure, improving the finishing accuracy.

The spacers 10PS ensure the space for forming the liquid crystal layer 300. The planar shape of each spacer 10PS in the present embodiment is an ellipse shape as shown in FIG. 7. Alternatively, the shape may be, for example, a polygonal shape or a circular shape. The spacers are each disposed in a region overlapping the black matrix layer 10BM.

Also, as shown in FIG. 7 and FIG. 8, the first contact hole 10CH1 and the second contact hole 10CH2 are alternately disposed in a color alignment direction 10L (typically, the row direction) in which the color filters of multiple colors (the red color filters 10CFR, the green color filters 10CFG, and the blue color filters 10CFB) are repeatedly arranged, and the absent portions 10CFX are each disposed strip pattern so as to overlap the first contact holes 10CH1 and the second contact holes 10CH2 arranged in the color alignment direction 10L. In such an embodiment, the color filter layer 10CF has a simple structure, improving the finishing accuracy.

Also, each absent portion 10CFX is located in a non-aperture portion (a portion not contributing to display) along the gate line 120L in a region sandwiched by two adjacent pixel lines as shown in FIG. 7.

As described, the present embodiment can provide an in-cell touch and with high quality, high transmittance, and high yield, which is particularly suitable for a curved display.

Next, a method for producing the liquid crystal display device 1 of the present embodiment is described. The TFT substrate 100 can be produced as follows. First, on the glass substrate 110 is formed the gate line layer 120 including the gate lines 120L and the gate electrodes 120E by forming a metal film by sputtering, for example, and then etching the film by photolithography. Next, the first insulating layer 130 is formed by forming an inorganic insulating film on the gate line layer 120 by chemical vapor deposition (CVD) or sputtering.

The thin film semiconductor layer 140 is formed by forming a thin film semiconductor film on the first insulating layer 130 by sputtering, for example, and then etching the film by photolithography. The source line layer 150 including the source lines 150L, the source electrodes 150E, and the drain electrodes 150D is formed on the thin film semiconductor layer 140 by forming a metal film by sputtering, for example, and then etching the film by photolithography. Next, the second insulating layer 160 is formed by forming an inorganic insulating film on the source line layer 150 by CVD or sputtering.

The color filter layer 10CF is formed by forming a photosensitive resin film containing a pigment, for example, on the second insulating layer 160, exposing the film to light, and developing the film, or the like. The third line layer including the touch panel lines 170 is formed by forming a metal film on the color filter layer 10CF by sputtering, for example, and then etching the film by photolithography. Next, the flattening film 100 is formed by forming a photosensitive resin film on the touch panel lines 170, exposing the film to the light, and developing the film, or the like.

The common electrode 100CM is formed by forming a transparent conductive film on the flattening film 180 by sputtering, for example, and then etching the film by photolithography. Next, the third insulating layer 190 is formed by forming an inorganic insulating film on the common electrode 100CM by CVD or sputtering and then etching the film by photolithography. Here, the second insulating layer 160 is also etched, whereby the first contact holes 10CH1 penetrating to the drain electrodes 150D are formed. Next, the pixel electrodes 100PX are formed by forming a transparent conductive film on the third insulating layer 190 by sputtering, for example, and then etching the film by photolithography. Moreover, the spacers 10PS are formed by forming a photosensitive resin film on the pixel electrodes 100PX, exposing the film to light, and developing the film, or the like.

When lead lines, such as the gate lines 120L and the source lines 150L which are led to the non-display region 10NA, are connected to different electrodes between the gate line layer 120 and the source line layer 150, contact holes for connecting the lead lines to different lines are formed in the first insulating layer 130 by etching the first insulating layer 130 by photolithography after forming the thin film semiconductor layer 140.

The counter substrate 200 can be produced by a typical production technique. For example, a photosensitive resin film containing a black pigment is formed on the glass substrate 210, followed by exposing the film to light, developing the film, or the like, whereby the black matrix layer 10BM is formed. Then, the overcoat layer 220 formed from a transparent organic insulating film is formed on the black matrix layer 10BM by spin-coating or slit-coating. Thereby, the counter substrate 200 can be produced.

Then, alignment films are formed by applying an alignment film material to the TFT substrate 100 and to the counter substrate 200, followed by an alignment treatment. Examples of the alignment film material include typical materials in the field of liquid crystal display devices, such as a polymer containing a polyimide as a main chain, a polymer containing a polyamic acid as a main chain, and a polymer containing a polysiloxane as a main chain. The alignment film material can be applied by any method, such as flexographic printing or inkjet coating. Examples of the alignment treatment include a rubbing treatment and a photo-alignment treatment.

Subsequently, a sealing material is applied to the TFT substrate 100 or the counter substrate 200, the liquid crystal layer 300 is formed in the region surrounded by the sealing material, and the TFT substrate 100 and the counter substrate 200 are attached to each other with the sealing material, whereby a liquid crystal display device of the present embodiment can be produced. Alternatively, the formation of the liquid crystal layer 300 in the region surrounded by the sealing material may be performed after attaching the TFT substrate 100 to the counter substrate 200. A specific example is the vacuum injection method including preparing an inlet in the pattern drawn with the sealing material and injecting liquid crystal in a vacuum chamber.

Next, a first polarizing plate and a second polarizing plate are respectively attached to the TFT substrate 100 on the side remote from the liquid crystal layer 300 and to the counter substrate 200 on the side remote from the liquid crystal layer 300 with their polarization axes being perpendicular to each other. Thereafter, a step of mounting the gate driver and the driver 20S, a step of mounting a backlight, a step of connecting a controller, and the like are performed, whereby the liquid crystal display device 1 of the present embodiment can be obtained.

Modified Example 1 of Embodiment

Figure 10:
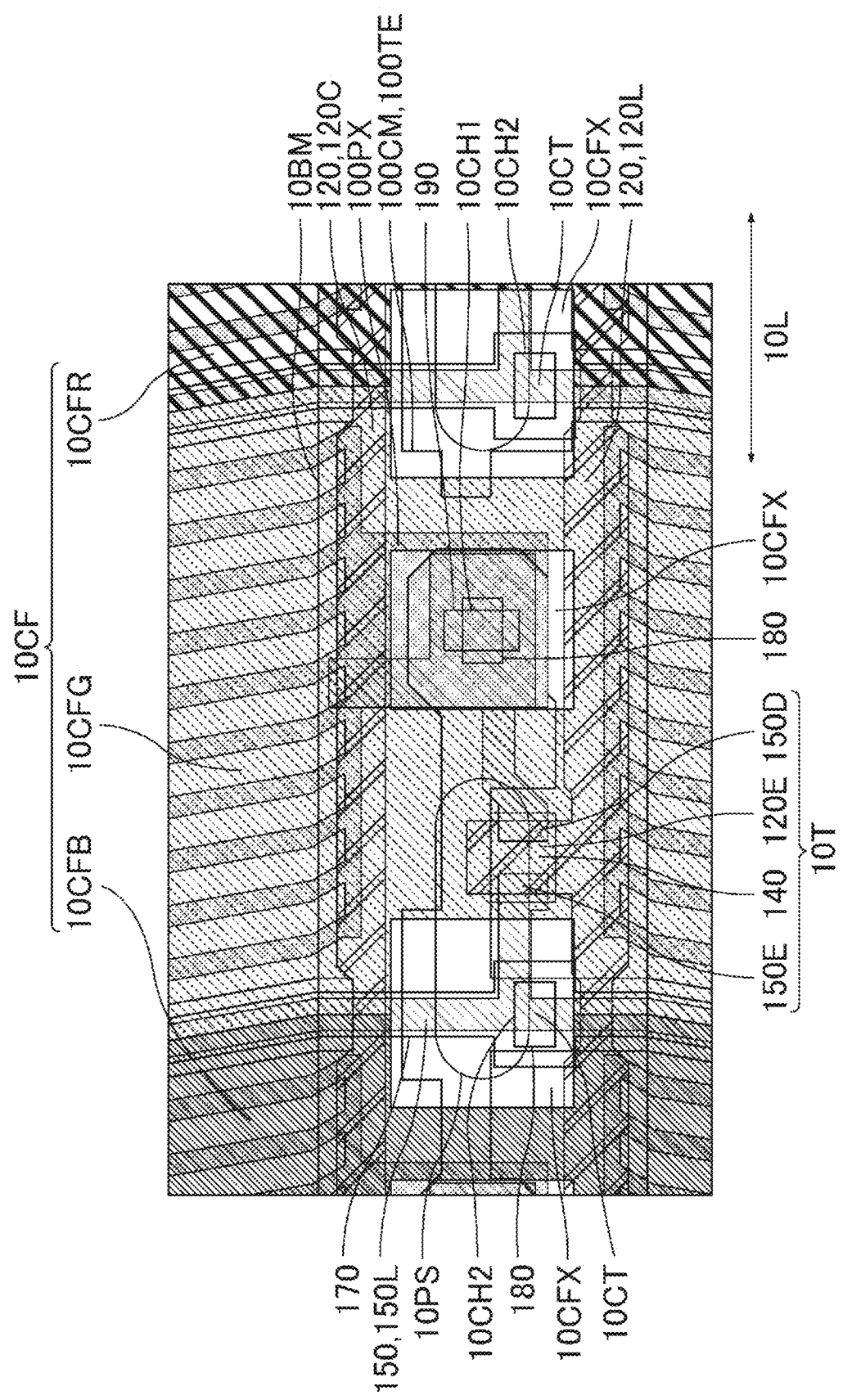
FIG. 10 is a schematic plan view of a liquid crystal display device of Modified Example 1 of Embodiment, showing a sub-pixel boundary region.

FIG. 10 is a schematic plan view of a liquid crystal display device of Modified Example 1 of Embodiment, showing a sub-pixel boundary region. Embodiment describes the case where the color filter layer 10CF is not disposed in a continuous region including a region overlapping the first contact hole 10CH1 and a region overlapping the contact region 10CT where the touch panel line 170 is in contact with the touch panel electrode 100TE. Alternatively, as shown in FIG. 10, the color filter layer 10CF may be independently absent in a region overlapping the first contact hole 10CH1 and in a region overlapping the contact region 10CT where the touch panel line 170 is in contact with the touch panel electrode 100TE. In such an embodiment, the depth of the flattening film 180 at the first contact hole 10CH1 can also be substantially the same as the depth of the flattening film 180 at the second contact hole 10CH2. Thus, when the first contact hole 10CH1 and the second contact hole 10CH2 are formed, similar tapered shapes tend to be obtained under the same production conditions. As a result, line connection failures can be further reduced both at the first contact hole 10CH1 and at the second contact hole 10CH2. More specifically, as shown in FIG. 10, the absent portions 10CFX may be independently disposed in a region overlapping the first contact hole 10CH1 and a region overlapping the contact region 10CT where the touch panel line 170 is in contact with the touch panel electrode 100TE.

Modified Example 2 of Embodiment

Figure 11:
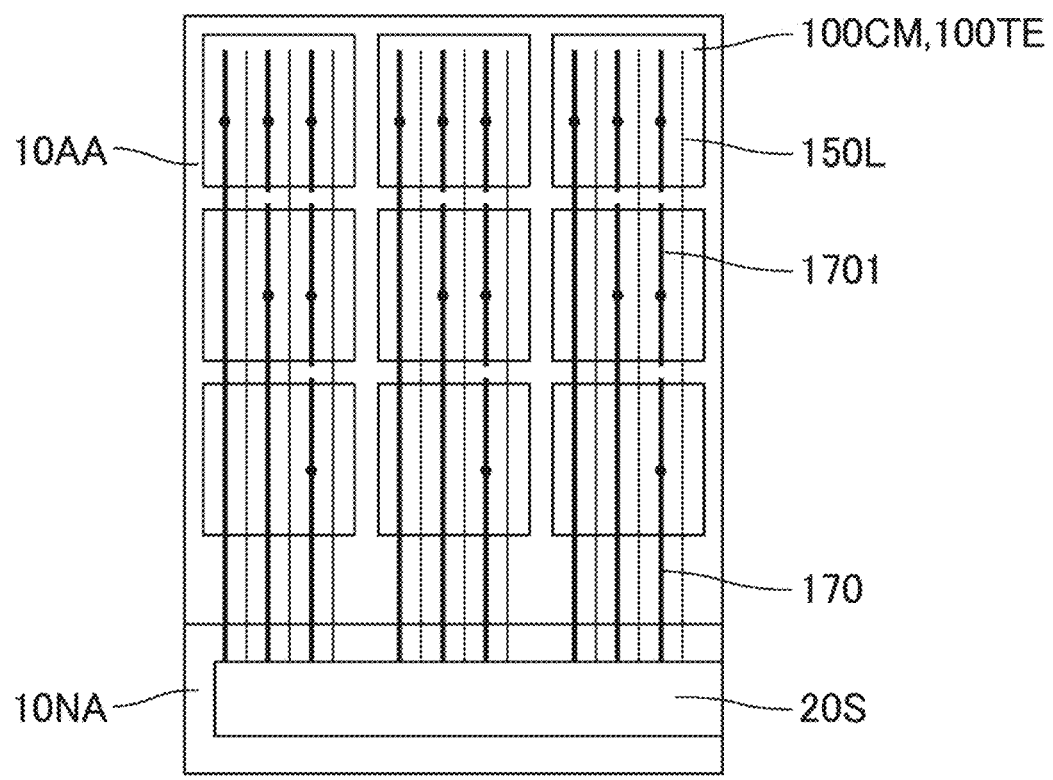
FIG. 11 is an enlarged schematic plan view of a liquid crystal display device of Modified Example 2 of Embodiment.

FIG. 11 is an enlarged schematic plan view of a liquid crystal display device of Modified Example 2 of Embodiment. The touch panel lines 170 in Embodiment are connected to the driver 20S and are vertically across the display region 10AA. The touch panel lines 170 may be cut in the display region 10AA.

As shown in FIG. 11, the touch panel lines 170 of the liquid crystal display device of the present modified example are connected to the driver 20S disposed in the non-display region 10NA and are vertically across the touch panel electrodes 100TE disposed in the display region 10AA. The touch panel lines 170 connected to the driver 20S extend toward the display region 10AA and are each connected to one of the touch panel electrodes 100TE. A touch panel line 170 connected to a first touch panel electrode 100TE is cut before reaching a second touch panel electrode 100TE that is next to the first touch panel electrode 100TE and is on the remote side of the driver 20S, to provide a dummy touch panel line portion 1701. The dummy touch panel line portion 1701 is connected to the second touch panel electrode 100TE. The dummy touch panel line portion 1701 is cut before reaching a third touch panel electrode 100TE that is next to the second touch panel electrode 100TE. The rest lines are sequentially connected to the touch panel electrodes 100TE or cut in the described manner. Connecting a dummy touch panel line portion 1701 to a touch panel electrode 100TE can reduce the internal resistance of the touch panel electrode 100TE. The source lines 150L and the touch panel lines 170 form capacitances. In order to allow all the source lines 150L to have substantially the same capacitance, unnecessary touch panel lines, i.e., the dummy touch panel line portions 1701 are left without being removed in the present modified example.

Modified Example 3 of Embodiment

Figure 12:
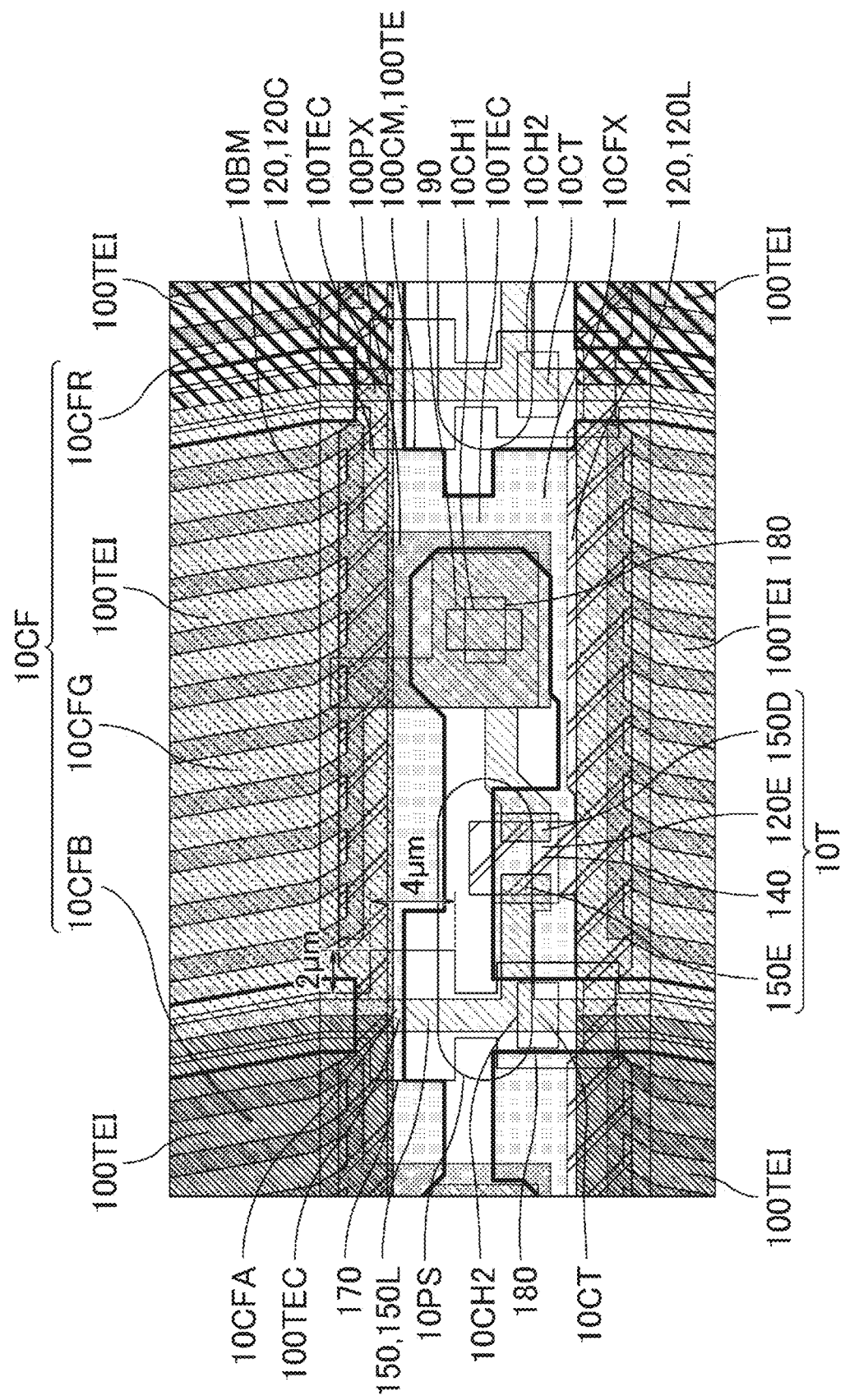
FIG. 12 is an enlarged schematic plan view of a liquid crystal display device of Modified Example 3 of Embodiment.
Figure 13:
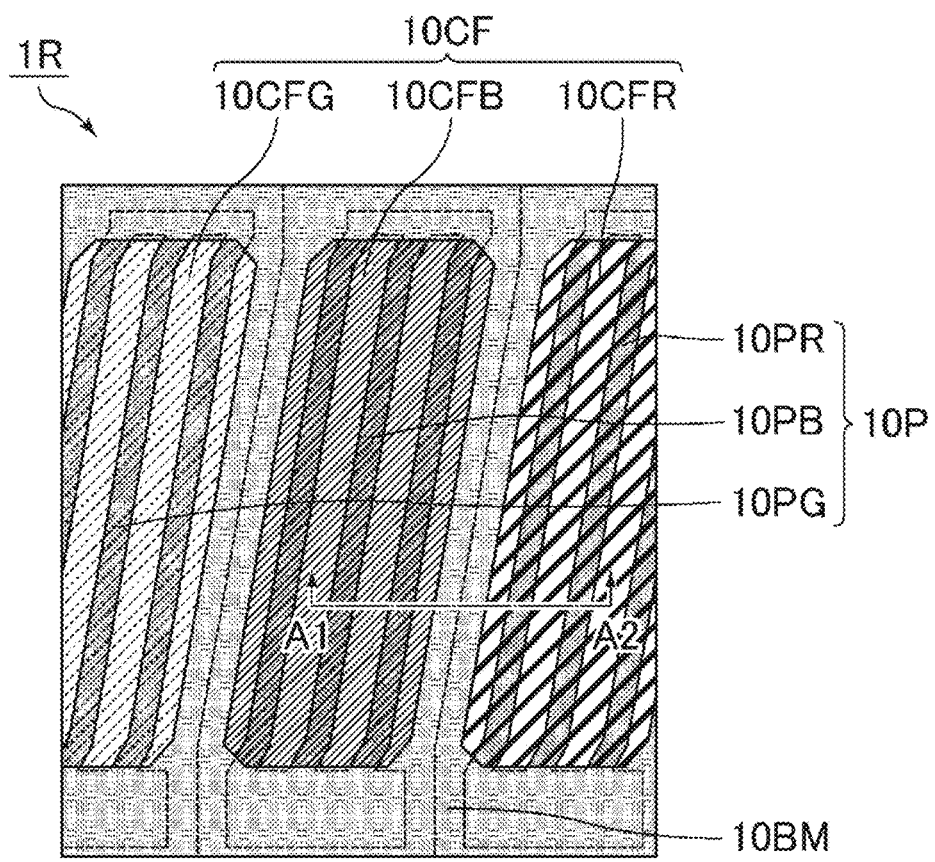
FIG. 13 is a figure relating to a liquid crystal display device of Comparative Embodiment 1, showing a schematic plan view where no fitting displacement occurs in attaching a TFT substrate to a counter substrate.
Figure 14:
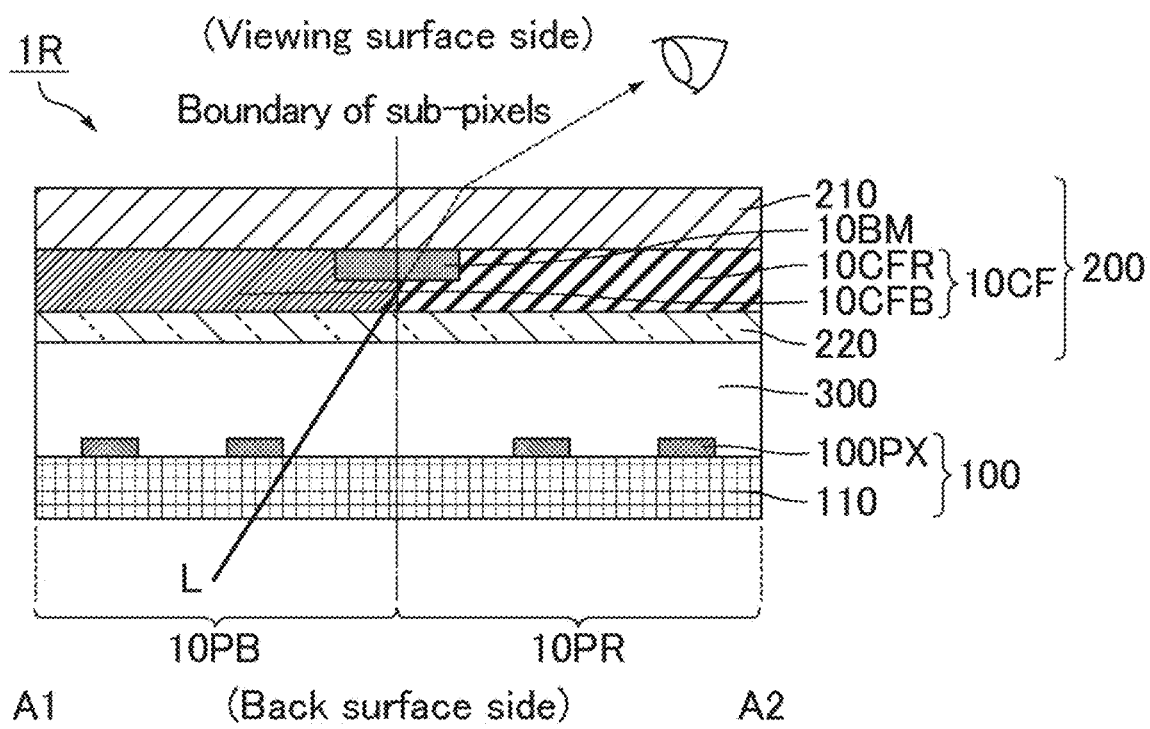
FIG. 14 is a schematic cross-sectional view taken along the line A1-A2 FIG. 13.
Figure 15:
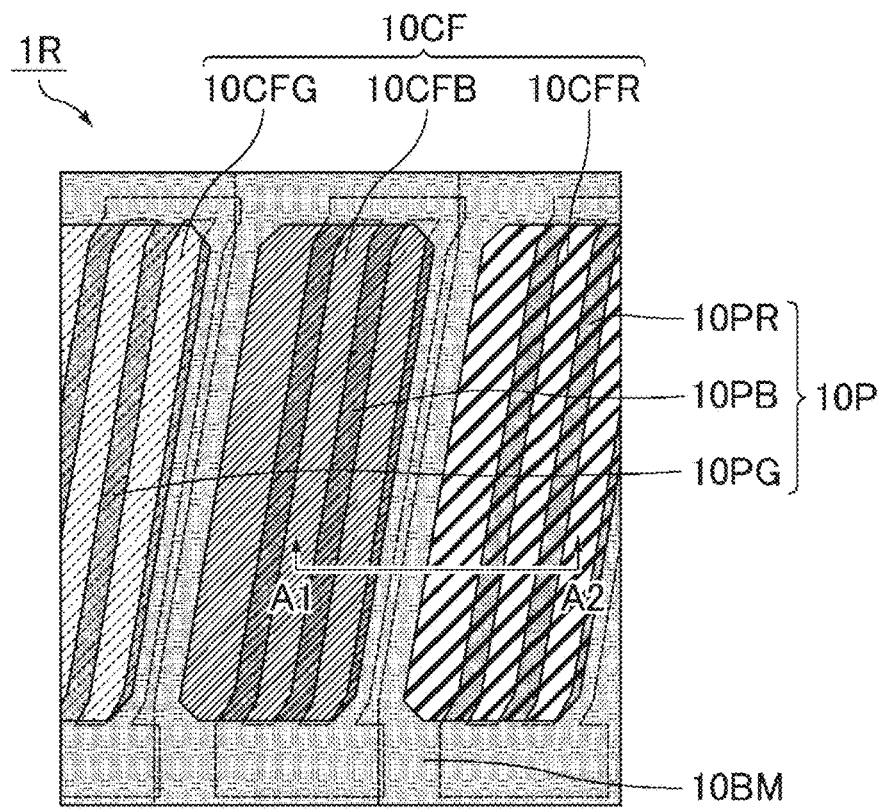
FIG. 15 is a figure relating to the liquid crystal display device of Comparative Embodiment 1, showing, a schematic plan view where fitting displacement occurs in attaching the TFT substrate to the counter substrate.
Figure 16:
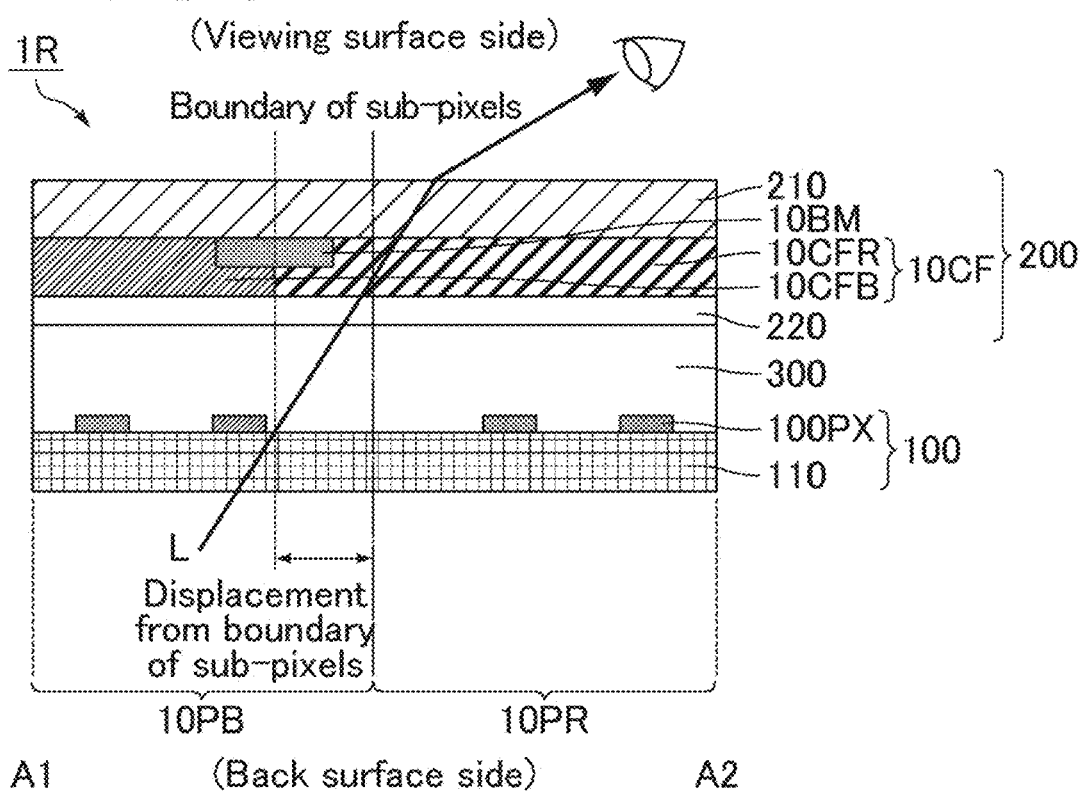
FIG. 16 is a schematic cross-sectional view taken along the line A1-A2 in FIG. 15.
Figure 17:
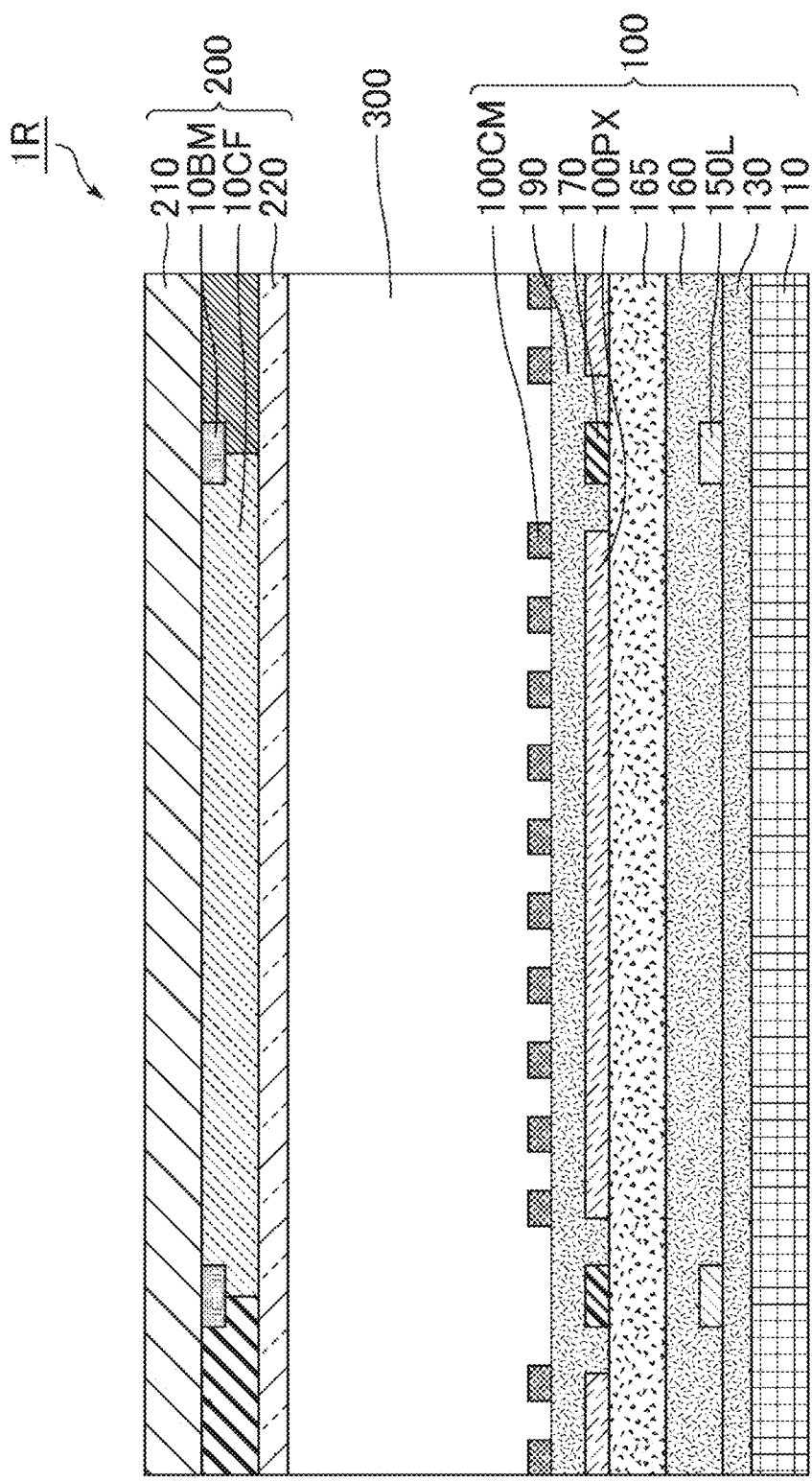
FIG. 17 is a schematic cross-sectional view of the liquid crystal display device of Comparative Embodiment 2.
Figure 18:
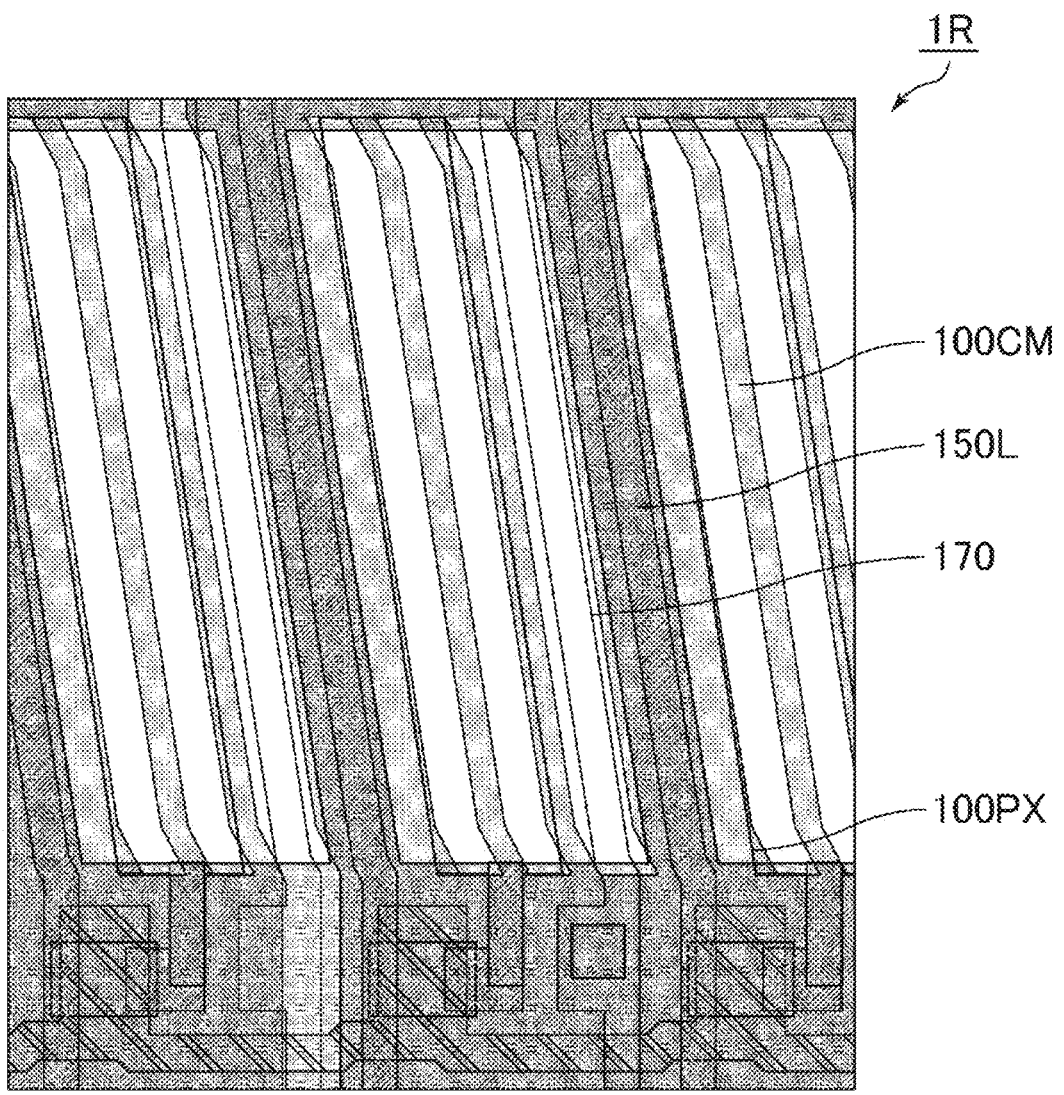
FIG. 18 is a schematic plan view of a liquid crystal display device of a modified example of Comparative Embodiment 2.
Figure 19:
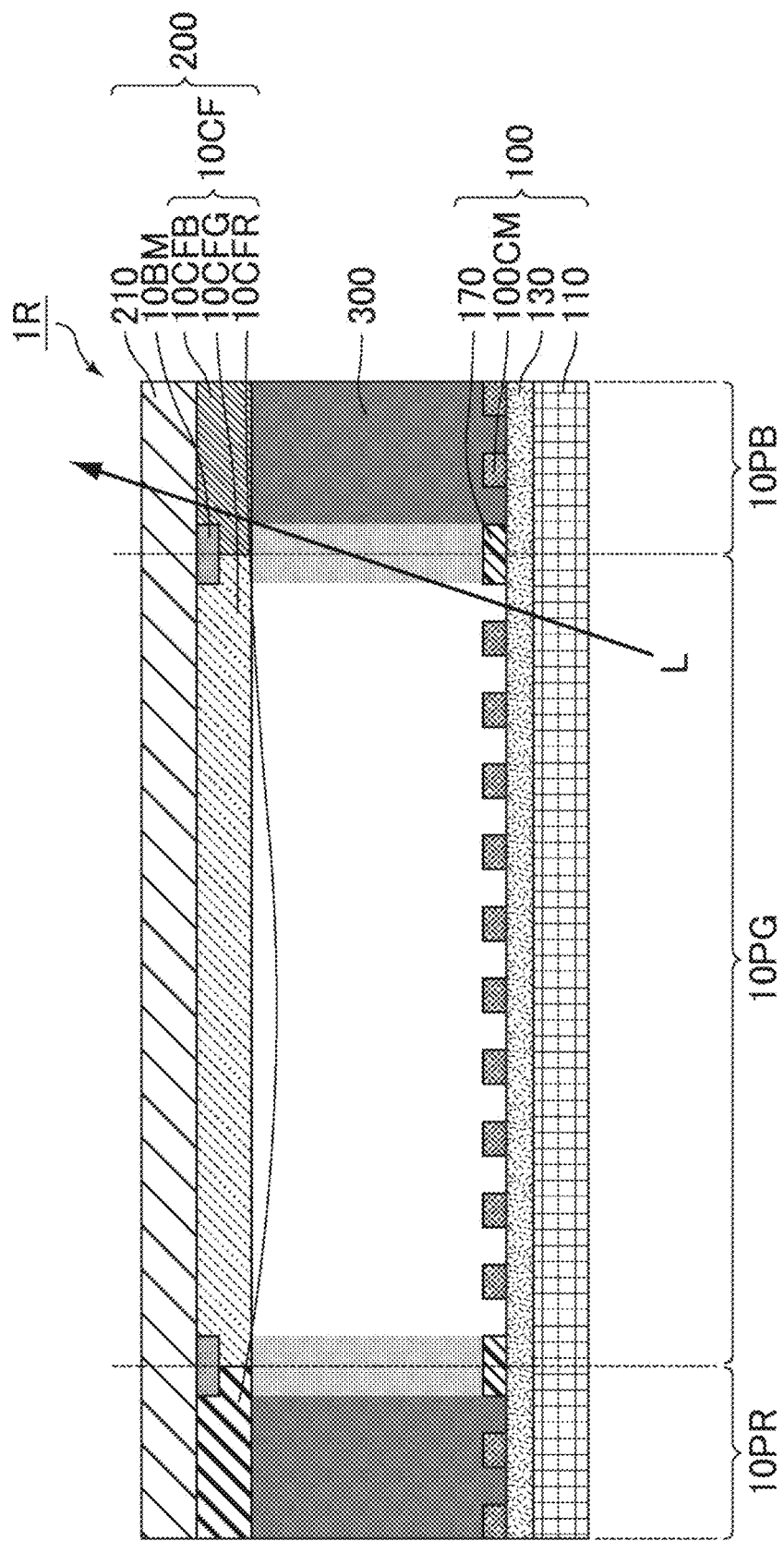
FIG. 19 is a schematic cross-sectional view of a liquid crystal display device of Comparative Embodiment 3.
Figure 20:
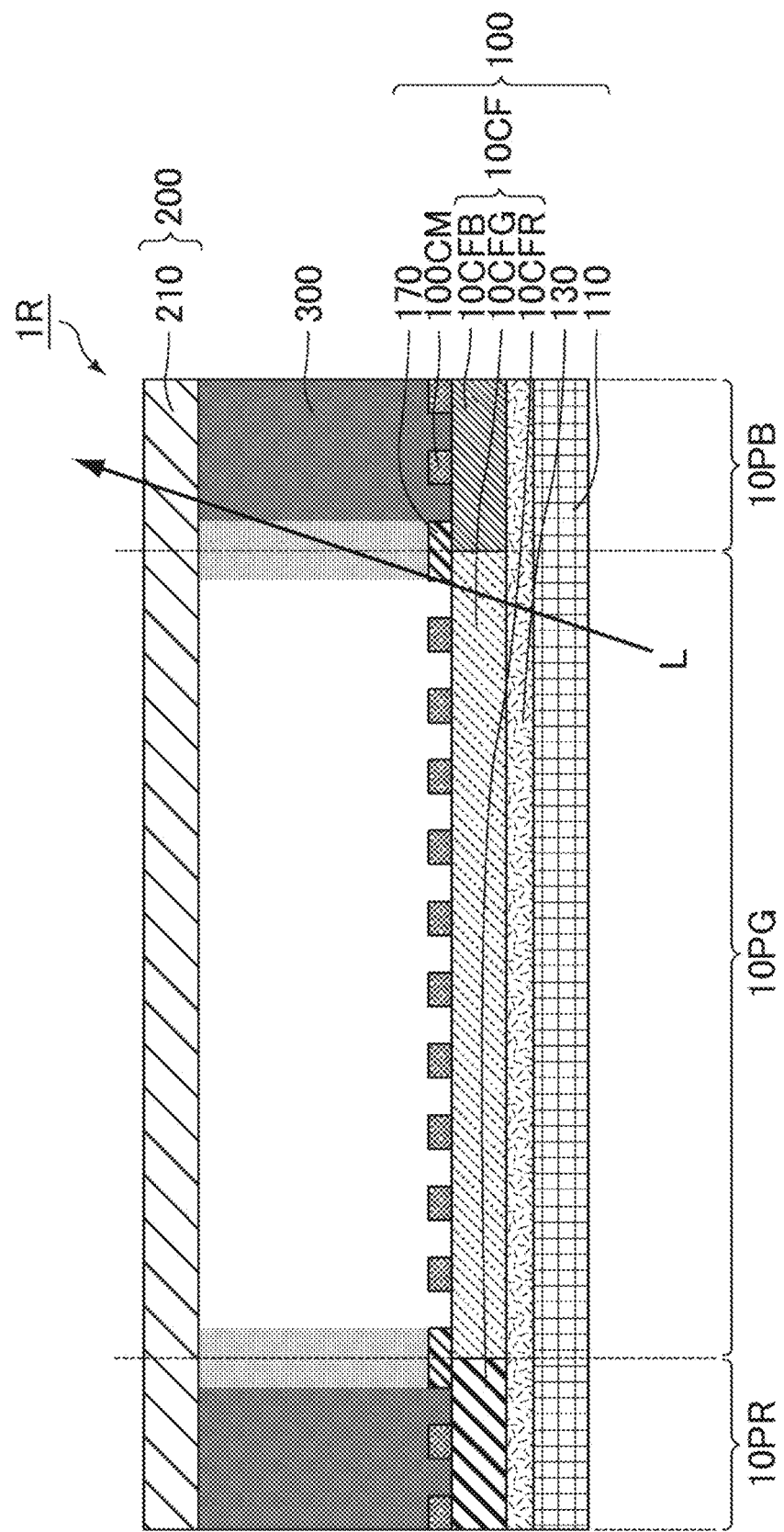
FIG. 20 is a schematic cross-sectional view of a liquid crystal display device of Comparative Embodiment 4.

FIG. 12 is an enlarged schematic plan view of a liquid crystal display device of Modified Example 3 of Embodiment. Each touch panel line 170 extends on or above an uneven portion 10CFA at an end of at least one of the color filters (e.g., the red color filters 10CFR, the green color filters 10CFG, and the blue color filters 10CFB). Thus, the touch panel line 170 may be problematically open-circuited in this portion. Accordingly, the taper angle of the uneven portion 10CFA at the ends of the color filters which the touch panel line 170 passes is made gentle, which can prevent open circuit of the touch panel line 170. In Embodiment, the line width of the touch panel line 170 is constant. Alternatively, the line width of the touch panel line 170 may be partly increased in a portion on or above the uneven portion 10CFA as shown in FIG. 12. Thereby, open circuit of the touch panel line 170 can be prevented.

Modified Example 4 of Embodiment

In Embodiment, lines disposed at the color boundaries are the source lines 150L. Still, the lines disposed at the color boundaries are not limited to these and may be the gate lines 120L, for example.

The liquid crystal display device of Embodiment includes vertical pixels (also referred to as longitudinal stripe pixels or longitudinal pixels) each of which includes three longitudinal sub-pixels including a red sub-Pixel 10PR, a green sub-pixel 10PG, and a blue sub-pixel 10PB in a stripe pattern. In Embodiment, the lines disposed at the color boundaries are the source lines 150L. In a liquid crystal display device including horizontal pixels (also referred to as lateral stripe pixels or lateral pixels) each of which includes three lateral sub-pixels including a red sub-pixel 10PR, a green sub-pixel 10PG, and a blue sub-pixel 10PB in a stripe pattern, the lines disposed at the color boundaries may be gate lines 120L, and the gate lines 120L may overlap the touch panel lines 170 and may be disposed at the boundaries of the color filters. In such an embodiment, the pixels 10P can have an increased aperture ratio. In this case, the touch panel lines 170 extend in the row direction.

REFERENCE SIGNS LIST 1, 1R: liquid crystal display device
10AA: display region
10NA: non-display region
10BM: black matrix layer
10CF: color filter layer
10CFA: uneven portion
10CFB: blue color filter
10CFG: green color filter
10CFR: red color filter
10CFX: absent portion
10CFZ, 10CH1Z, 180Z: side wall
10CH1, 10CH2: contact hole
10CT: contact region
10L: color alignment direction
10P: pixel
10PB: blue sub-pixel
10PG: green sub-pixel
10PR: red sub-pixel
10PS: spacer
10PX: sub-pixel
10T: thin-film transistor
20S: driver
100: TFT substrate
100CM: common electrode
100PX: pixel electrode
100TE: touch panel electrode
100TEC: connection portion
100TEI: sub-pixel corresponding portion 110, 210: glass substrate
120: gate line layer
120C: auxiliary capacitor line
120E: gate electrode
120L: gate line
130, 160, 190: insulating layer
140: thin film semiconductor layer
150: source line layer
150D: drain electrode
150E: source electrode
150L: source line
165: resin flattening film
170: touch panel line
180: flattening film
200: counter substrate
220: overcoat layer
300: liquid crystal layer
1701: dummy touch panel line portion
L: light

What is claimed is:

1. A liquid crystal display device comprising:
a first substrate;
a second substrate facing the first substrate;
a liquid crystal layer between the first substrate and the second substrate; and
a display region for providing images;
the first substrate comprising:
  a thin-film transistor;
  a pixel electrode connected to the thin-film transistor;
  a color filter layer including color filters of multiple colors;
  a touch panel line on a liquid crystal layer side of the color filter layer;
  a flattening film on a liquid crystal layer side of the touch panel line; and
  a plurality of touch panel electrodes arranged in a matrix on a liquid crystal layer side of the flattening film,
wherein the touch panel line is disposed at a boundary of the color filters of multiple colors of the color filter layer and connected to at least one of the plurality of touch panel electrodes in the display region,
the liquid crystal display device is provided with a first contact hole penetrating through at least the flattening film and a second contact hole penetrating through at least the flattening film,
the touch panel line is connected to the at least one of the plurality of touch panel electrodes through the second contact hole,
the color filter layer is not disposed in a continuous region including a region overlapping the first contact hole and a region overlapping a contact region where the touch panel line is in contact with the at least one of the plurality of touch panel electrodes, and
the pixel electrode is disposed on the liquid crystal layer side of the flattening film and is connected to a drain electrode of the thin-film transistor through the first contact hole.

2. The liquid crystal display device according to claim 1, wherein the first substrate includes a spacer protruding toward the second substrate, and
the spacer is entirely overlapped with the continuous region without the color filter layer.

3. The liquid crystal display device according to claim 1, wherein the first substrate further includes a line connected to the thin-film transistor, and
the line overlaps the touch panel line and is disposed at the boundary of the color filters.

4. The liquid crystal display device according to claim 1, wherein the touch panel line has a wider line width in a portion on or above an uneven portion at an end of at least one of the color filters of multiple colors of the color filter layer.

5. The liquid crystal display device according to claim 1, wherein, during a writing period in which a display signal for display is written, the at least one of the plurality of touch panel electrodes has a pixel standard potential and during a sensing period, no display signal is written.

6. The liquid crystal display device according to claim 1, wherein a line width of the touch panel line is substantially constant, except for the line width of the touch panel line that is partly increased in a portion on or above an uneven portion at an end of at least one of the color filters of multiple colors of the color filter layer.

7. The liquid crystal display device according to claim 1, wherein the flattening film is an organic insulating film.

8. The liquid crystal display device according to claim 1, wherein the liquid crystal display device is provided with a plurality of first contact holes and a plurality of second contact holes, and
the continuous region is disposed in a strip pattern so as to overlap the plurality of first contact holes and the plurality of second contact holes arranged in an alignment direction of the color filters of multiple colors of the color filter layer.

9. The liquid crystal display device according to claim 1, wherein the first substrate further comprises a source line extending in a column direction and connected to a source electrode of the thin-film transistor,
the source electrode protrudes from the source line,
the touch panel line extends in the column direction, and
the source line overlaps the touch panel line and is disposed at the boundary of the color filters.

10. The liquid crystal display device according to claim 1, wherein the first substrate further comprises a gate line extending in a row direction and connected to a gate electrode of the thin-film transistor,
the touch panel line extends in the row direction, and
the gate line overlaps the touch panel line and is disposed at the boundary of the color filters.

11. The liquid crystal display device according to claim 1, wherein the first substrate includes a spacer protruding toward the second substrate and is formed of resin film on the pixel electrode,
the second substrate includes a black matrix layer, and
the spacer is disposed in a region overlapping the black matrix layer.

* * * * *